United States Patent
Funami et al.

(10) Patent No.: US 12,157,180 B2
(45) Date of Patent: Dec. 3, 2024

(54) EVALUATION METHOD, EVALUATION SYSTEM, AND LASER MACHINING SYSTEM

(71) Applicant: Panasonic Intellectual Property Management Co., Ltd., Osaka (JP)

(72) Inventors: Koji Funami, Kyoto (JP); Kazuki Fujiwara, Osaka (JP); Izuru Nakai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 226 days.

(21) Appl. No.: 17/494,183

(22) Filed: Oct. 5, 2021

(65) Prior Publication Data
US 2022/0143745 A1    May 12, 2022

(30) Foreign Application Priority Data
Nov. 9, 2020    (JP) .................... 2020-186656

(51) Int. Cl.
*B23K 26/046* (2014.01)
*B23K 11/36* (2006.01)
(Continued)

(52) U.S. Cl.
CPC ............ *B23K 26/046* (2013.01); *B23K 11/36* (2013.01); *B23K 26/0869* (2013.01);
(Continued)

(58) Field of Classification Search
CPC .................................................. B23K 26/034
See application file for complete search history.

(56) References Cited

U.S. PATENT DOCUMENTS

| | | | | |
|---|---|---|---|---|
| 2010/0134628 A1* | 6/2010 | Hesse | .................... | B23K 26/03 219/121.85 |
| 2014/0175071 A1* | 6/2014 | Pfitzner | .................. | B23K 26/32 348/90 |

(Continued)

FOREIGN PATENT DOCUMENTS

| | | | | |
|---|---|---|---|---|
| DE | 102013215362 A1 * | 2/2015 | ........... | B23K 26/032 |
| DE | 102016014564 A1 * | 6/2018 | | |

(Continued)

OTHER PUBLICATIONS

DE-102013215362-A1 (Dorsch Friedhelm) Feb. 5, 2015 [retrieved on Aug. 30, 2024]. Retrieved from Espacenet Database, translation by EPO and Google. (Year: 2015).*

(Continued)

*Primary Examiner* — John J Norton
*Assistant Examiner* — Franklin Jefferson Wang
(74) *Attorney, Agent, or Firm* — Wenderoth, Lind & Ponack, L.L.P.

(57) ABSTRACT

An evaluation method for evaluating laser machining in which irradiation region of a laser beam is moved relative to object to perform machining of object, includes a measurement step and an evaluation step. In the measurement step, a change in an intensity of light according to a movement of measurement region is measured by moving measurement region for measuring the intensity of light, relative to object. In the evaluation step, an evaluation of the laser machining is performed based on the change in the intensity of light according to the movement of measurement region. In the measurement step, measurement region is moved relative to object so that movement path of measurement region has a plurality of intersections with movement path of irradiation region.

12 Claims, 21 Drawing Sheets

(51) Int. Cl.
*B23K 26/08* (2014.01)
*B23K 26/38* (2014.01)
*B23K 26/70* (2014.01)
*B23K 37/04* (2006.01)

(52) U.S. Cl.
CPC ............ *B23K 26/38* (2013.01); *B23K 26/707* (2015.10); *B23K 37/0417* (2013.01)

(56) References Cited

U.S. PATENT DOCUMENTS

| | | | | |
|---|---|---|---|---|
| 2016/0356595 | A1* | 12/2016 | Lessmueller | B23K 26/044 |
| 2019/0091798 | A1* | 3/2019 | Sch?nleber | B23K 26/21 |
| 2020/0016691 | A1* | 1/2020 | Tanaka | B23K 26/082 |
| 2020/0023461 | A1* | 1/2020 | Galbraith | H01S 3/067 |
| 2020/0055142 | A1* | 2/2020 | Schürmann | B23K 26/1462 |

FOREIGN PATENT DOCUMENTS

| | | | |
|---|---|---|---|
| JP | 7-185855 | | 7/1995 |
| JP | 3154177 B | | 4/2001 |
| JP | 2002-126885 | | 5/2002 |
| JP | 2004-216446 | | 8/2004 |
| JP | 2007-098442 | | 4/2007 |
| JP | 2008055442 A | * 3/2008 | ............. B23K 26/03 |
| JP | 2017-113789 | | 6/2017 |

OTHER PUBLICATIONS

DE-102016014564-A1 (Lessmuller Eckhard) Jun. 7, 2018 [retrieved on Aug. 30, 2024]. Retrieved from Espacenet Database, translation by EPO and Google. (Year: 2018).*

* cited by examiner

EVALUATION METHOD, EVALUATION SYSTEM, AND LASER MACHINING SYSTEM

BACKGROUND

1. Technical Field

The present disclosure generally relates to an evaluation method, an evaluation system, and a laser machining system. More specifically, the present disclosure relates to an evaluation method, an evaluation system, and a laser machining system in which light generated in an object due to irradiation of a laser beam to the object is used to evaluate laser machining.

2. Description of the Related Art

In a conventional laser welding quality evaluation method, the evaluation of laser welding quality is performed in real time from a peak intensity of welding light (heat radiation light, plasma light, laser reflected light, or the like) generated at a melting portion during laser welding, or an integrated value of the intensity of welding light. For example, in Japanese Patent No. 3154177, determination of a welding defect is performed by using a peak intensity of plasma light or reflected light generated in a melting portion during laser welding. In Japanese Patent Unexamined Publication No. 2007-98442, determination of a welding defect is performed by using time-integrated intensity of reflected light, plasma light, and infrared light generated in a melting portion during laser welding.

SUMMARY

One aspect of the present disclosure is an evaluation method of laser machining in which an irradiation region of a laser beam from a laser oscillator to an object is moved relative to the object to perform machining of the object. The evaluation method includes a measurement step and an evaluation step. In the measurement step, a change in an intensity of light according to a movement of a measurement region is measured by a photometer for measuring the intensity of light by moving the measurement region of the photometer relative to the object. In the evaluation step, an evaluation of the laser machining is performed based on the change in the intensity of light according to the movement of the measurement region measured in the measurement step. In the measurement step, the measurement region is moved relative to the object so that a movement path of the measurement region has a plurality of intersections with a movement path of the irradiation region.

One aspect of the present disclosure is an evaluation system of laser machining in which an irradiation region of a laser beam from a laser oscillator to an object is moved relative to the object to perform machining of the object. The evaluation system includes a processing device that executes measuring processing and evaluating processing. In the measuring processing, a measurement region of a photometer for measuring an intensity of light is moved relative to the object to measure a change in the intensity of light according to a movement of the measurement region by the photometer. In the evaluating processing, an evaluation of the laser machining is performed based on the change in the intensity of light according to the movement of the measurement region measured in the measuring processing. In the measuring processing, the measurement region is moved relative to the object so that a movement path of the measurement region has a plurality of intersections with a movement path of the irradiation region.

One aspect of the disclosure is a laser machining system. The laser machining system includes a laser oscillator for irradiating an object with a laser beam; a photometer that measures an intensity of light; and a processing device that is connected to the laser oscillator and the photometer. The processing device executes machining processing, measuring processing, and evaluating processing. In the machining processing, an irradiation region of the laser beam from the laser oscillator to the object is moved relative to the object to perform machining of the object. In the measuring processing, a measurement region of the photometer is moved relative to the object to measure a change in the intensity of light according to a movement of the measurement region by the photometer. In the evaluating processing, an evaluation of machining in the machining processing is performed based on the change in the intensity of light according to the movement of the measurement region measured in the measuring processing. In the measuring processing, the measurement region is moved relative to the object so that a movement path of the measurement region has a plurality of intersections with a movement path of the irradiation region.

DETAILED DESCRIPTIONS

In a conventional evaluation method of laser welding quality, a monitoring region (measurement region) for detecting welding light coincides with a laser irradiation position, and an intensity of light is measured only in a melting portion. Therefore, it is not possible to accurately detect a melting abnormality generated around a welding portion instead of the melting portion. Specifically, it is not possible to accurately detect whisker-like melting object, spatter adhesion, or the like on an outside of the melting portion.

The present disclosure provides an evaluation method, an evaluation system, and a laser machining system capable of improving accuracy of evaluation of laser machining.

Hereinafter, exemplary embodiments will be described in detail with reference to the drawings as appropriate. However, more detailed explanation than necessary may be omitted. For example, detailed explanations of already well-known matters and duplicate explanations for substantially the same configuration may be omitted. This is to avoid unnecessary redundancy of the following description and to facilitate the understanding of those skilled in the art. It should be noted that the inventor(s) provide the attached drawings and the following description in order to fully understand the present disclosure by those skilled in the art and do not intend to limit the subject matter described in the claims.

EXEMPLARY EMBODIMENTS 1-1. Overview

Figure 1:
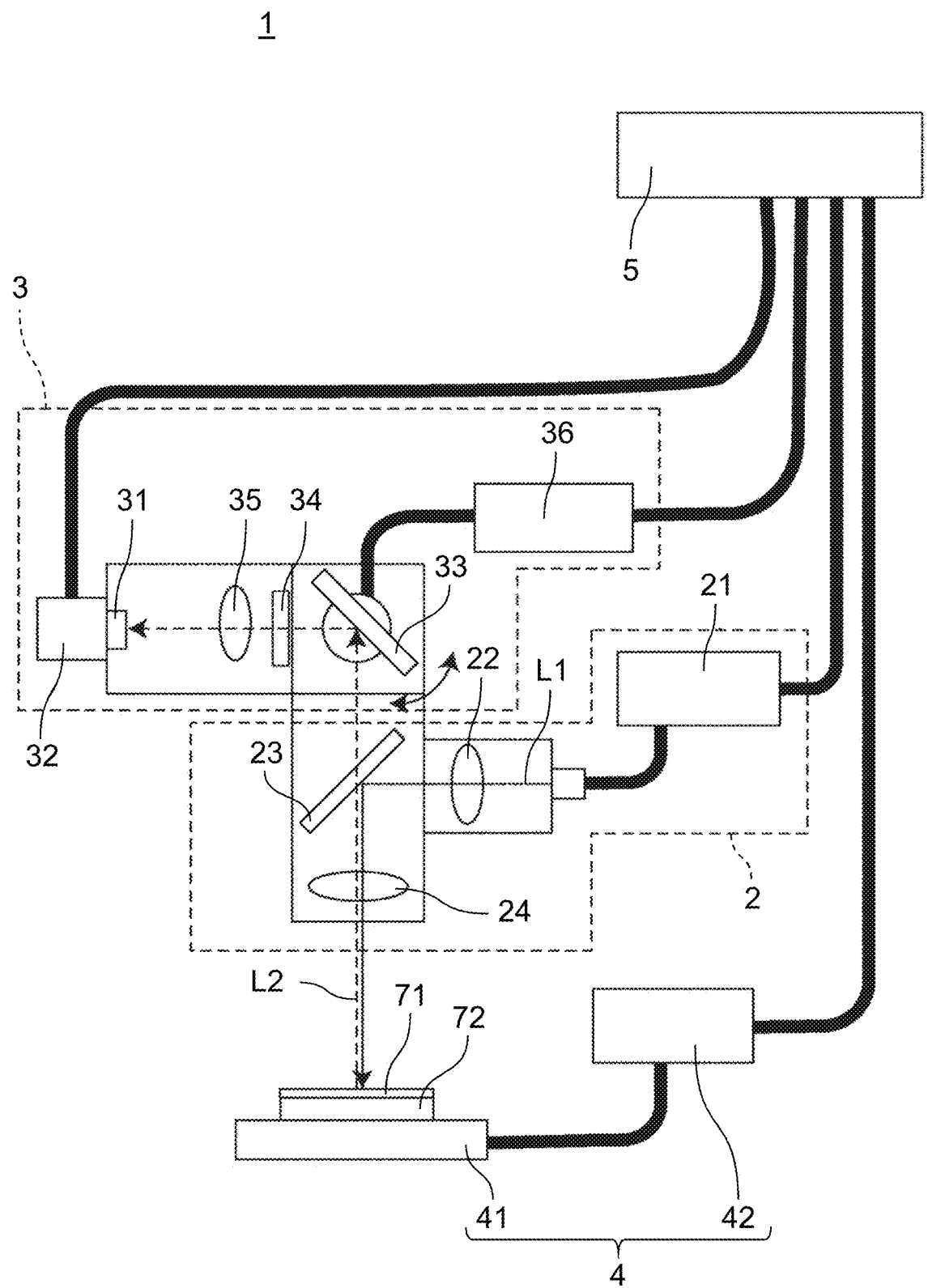
FIG. 1 is a block diagram of a configuration example of a laser machining system according to an exemplary embodiment.

FIG. 1 is a block diagram of a configuration example of laser machining system 1 according to an exemplary embodiment. Laser machining system 1 includes laser oscillator 21, photometer 31, and processing device 5. Laser machining system 1 performs machining of object 71 by irradiating object 71 with laser beam L1 from laser oscillator 21. In FIG. 1, laser machining system 1 is used for laser welding by which object 71 is joined to another object 72. Object 72 is disposed below object 71. By irradiating object 71 with laser beam L1 and melting object 71 and a part of object 72 to form melting portion 74, object 71 and object 72 are melt-joined to each other.

Figure 2:
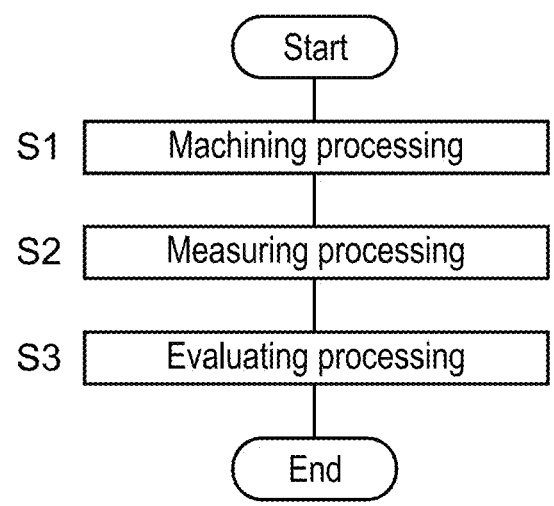
FIG. 2 is a flowchart of an operation of the laser machining system of FIG. 1.

In laser machining system 1, as illustrated in FIG. 2, processing device 5 executes machining processing S1, measuring processing S2, and evaluating processing S3.

Figure 3:
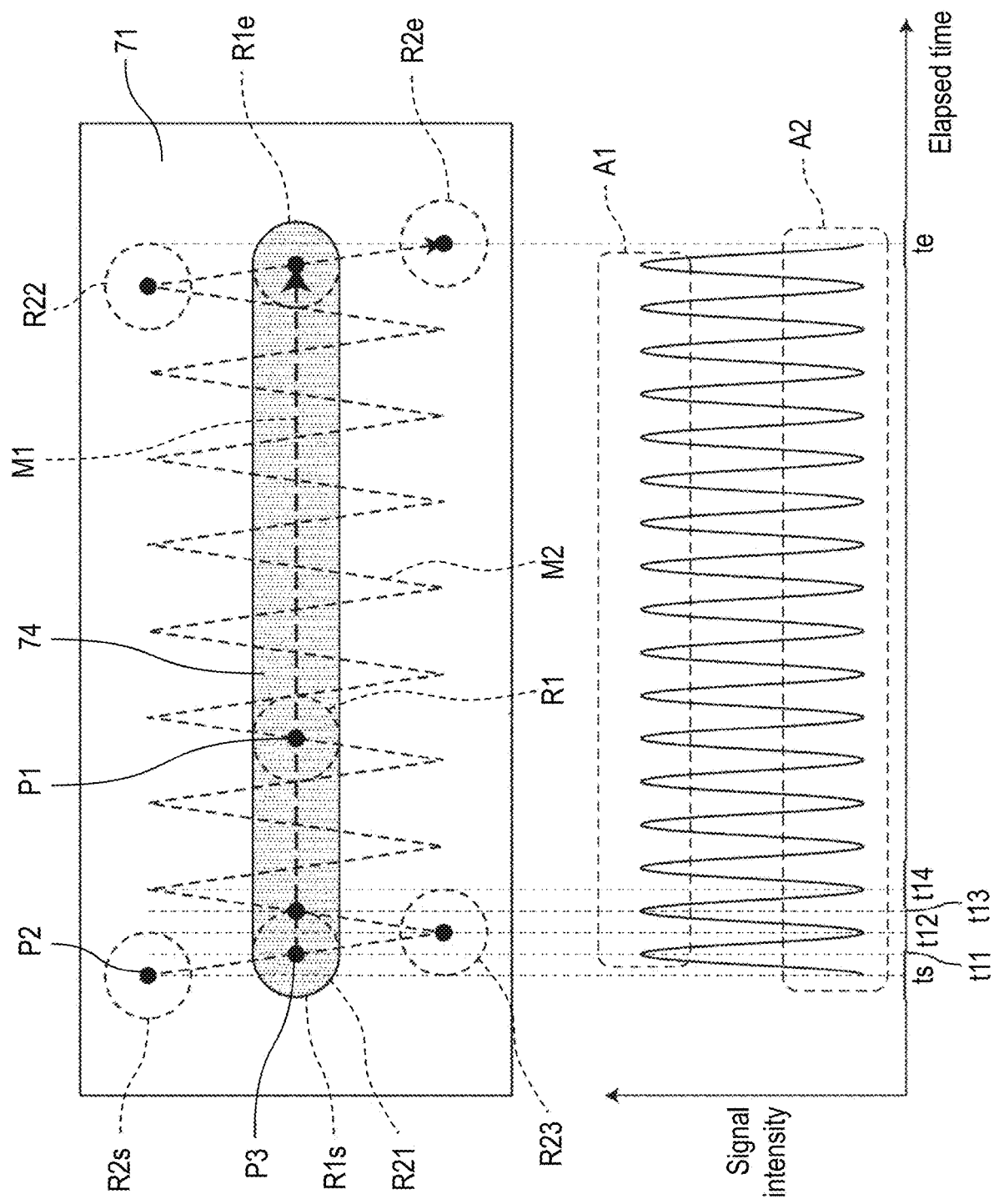
FIG. 3 is an explanatory view illustrating a relationship between a measurement waveform obtained by measuring processing illustrated in FIG. 2 and an object in a case where there is an abnormality in a melting portion of an object.

As illustrated in FIG. 3, machining processing S1 performs machining of object 71 by moving irradiation region R1 of laser beam L2 from laser oscillator 21 to object 71, relative to object 71. In FIG. 3, in machining processing S1, irradiation region R1 is moved relative to object 71 from first irradiation region R1s to last irradiation region R1e. Movement path M1 of irradiation region R1 is set such that a desired shape of melting portion 74 can be obtained. In FIG. 3, melting portion 74 is linear and movement path M1 is also linear.

As illustrated in FIG. 1, in measuring processing S2, the intensity of light L2 from object 71 due to the irradiation of laser beam L1 to object 71 is measured. In FIG. 1, laser beam L1 and light L2 are drawn in a staggered manner for easy understanding, but they are actually on the same axis. As illustrated in FIG. 3, in measuring processing S2, measurement region R2 of photometer 31 is moved relative to object 71 to measure a change in the intensity of light L2 according to the movement of measurement region R2 by photometer 31. In FIG. 3, measurement region R2 moves relative to object 71 from first measurement region R2s to last measurement region R2e. In particular, in measuring processing S2, measurement region R2 is moved relative to object 71 so that movement path M2 of measurement region R2 has a plurality of intersections P3 with movement path M1 of irradiation region R1.

In evaluating processing S3, the laser machining is evaluated based on the change in the intensity of light L2 according to the movement of measurement region R2 measured in measuring processing S2. The change in the intensity of light L2 according to the movement of measurement region R2 is illustrated in FIG. 3 as a change in a signal intensity with respect to an elapsed time. The signal intensity is the intensity of the detection signal from measurement system 3, which corresponds to the intensity of light L2.

In laser machining system 1 of FIG. 1, in measuring processing S2, measurement region R2 is moved relative to object 71 so that movement path M2 of measurement region R2 has the plurality of intersections P3 with movement path M1 of irradiation region R1. In measuring processing S2, measurement region R2 does not always coincide with movement path M1 of irradiation region R1, and measurement region R2 is also set in a region different from movement path M1 of irradiation region R1. Therefore, in evaluating processing S3, based on the intensity of light L2, not only the abnormality of the laser machining in the region coinciding with movement path M1 of irradiation region R1 but also the abnormality of the laser machining in a region different from movement path M1 of irradiation region R1 can be evaluated. Therefore, according to laser machining system 1 of FIG. 1, it is possible to improve the accuracy of the evaluation of laser machining.

1-2. Details

Hereinafter, laser machining system 1 of FIG. 1 will be described in more detail. Laser machining system 1 includes laser irradiation system 2, measurement system 3, movement system 4, and processing device 5.

1-2-1. Laser Irradiation System

In FIG. 1, laser irradiation system 2 irradiates object 71 with laser beam L1 for laser machining of object 71. Laser irradiation system 2 includes laser oscillator 21, collimating lens 22, dichroic mirror 23, and condenser lens 24. Laser oscillator 21 outputs laser beam L1 for the laser machining of object 71. A wavelength of laser beam L1 is, for example, 1070 nm, but is appropriately set. Laser beam L1 may be a continuous wave or a pulse wave. Collimating lens 22, dichroic mirror 23, and condenser lens 24 form an optical system that guides laser beam L1 to object 71. In FIG. 1, laser beam L1 output from laser oscillator 21 is converted into a parallel beam by collimating lens 22, reflected at a right angle toward object 71 by dichroic mirror 23, and condensed by condenser lens 24, and object 71 is irradiated. A surface of dichroic mirror 23 is specially coated so as to totally reflect light having a wavelength equal to the wavelength of laser beam L1 and transmit light having a wavelength different from the wavelength of laser beam L1.

1-2-2. Measurement System

In FIG. 1, measurement system 3 measures the intensity of light L2 generated by object 71 during the laser machining, and outputs a detection signal indicating the intensity of light L2. Light L2 includes, for example, thermal radiation light due to the melting of object 71 by irradiating object 71 with laser beam L1. The intensity of thermal radiation light becomes large according to a melting state such as a melting temperature and a melting area. Light L2 may include not only thermal radiation light but also reflected light of laser beam L1 in object 71 and unique light generated by exciting a material of object 71. Measurement system 3 includes photometer 31, detection signal amplifier 32, optical member 33, bandpass filter 34, imaging lens 35, and adjustment device 36.

Photometer 31 measures the intensity of light L2 in measurement region R2. Photometer 31 includes a light receiving sensor. Photometer 31 measures the intensity of light L2 incident on the light receiving sensor, and outputs a detection signal indicating the intensity of light L2 to detection signal amplifier 32. Detection signal amplifier 32 amplifies the detection signal from photometer 31 and outputs the detection signal to processing device 5.

Optical member 33, bandpass filter 34, and imaging lens 35 form an optical system for setting measurement region R2 of photometer 31 on object 71.

Optical member 33 is on the opposite side of condenser lens 24 with respect to dichroic mirror 23. Optical member 33 guides light L2 from measurement region R2 to photometer 31. The position of optical member 33 with respect to photometer 31 can be adjusted so that measurement region R2 moves relative to object 71. In FIG. 1, optical member 33 is rotatable clockwise and counterclockwise. The position of optical member 33 with respect to photometer 31 is a rotational position around a rotation axis of optical member 33. Optical member 33 includes, for example, a movable total reflection mirror. The movable total reflection mirror is, for example, a galvano mirror. The galvano mirror can rotate with high accuracy and at high speed. In optical member 33, the rotation axis of the movable total reflection mirror is along moving direction D2 of stage 41. Therefore, optical member 33 can move measuring processing region R2 in a direction orthogonal to moving direction D2 of stage 41, but cannot move measuring processing region R2 in moving direction D2 of stage 41. Optical member 33 is disposed such that measurement region R2 coincides with irradiation region R1 in moving direction D2 regardless of the rotation of optical member 33. In FIG. 1, optical member 33 is rotatable clockwise and counterclockwise.

Bandpass filter 34 and imaging lens 35 are located between optical member 33 and photometer 31 in this order. Bandpass filter 34 allows light in a predetermined wavelength band to pass through and the light to be incident on imaging lens 35. The predetermined wavelength band is, for example, a wavelength band of 1300 nm to 1350 nm. In this case, only light in the wavelength band of 1300 nm to 1350 nm is incident on photometer 31. Imaging lens 35 forms an image of light L2, which has passed through bandpass filter 34, by photometer 31. In FIG. 1, light L2 from measurement region R2 passes through condenser lens 24 and dichroic mirror 23, and is incident on optical member 33. Light L2 incident on optical member 33 is reflected by optical member 33, passes through bandpass filter 34 and imaging lens 35, and is incident on photometer 31.

Adjustment device 36 adjusts the position of optical member 33 with respect to photometer 31. In FIG. 1, optical member 33 is rotatable clockwise and counterclockwise. Adjustment device 36 is, for example, a motor driver that controls a motor that rotates optical member 33.

1-2-3. Movement System

In FIG. 1, movement system 4 moves object 71 with respect to irradiation region R1 of laser beam L1 from laser irradiation system 2. Movement system 4 includes stage 41 and movement device 42. Stage 41 supports object 71 of the laser machining. In FIG. 1, object 72 is installed under object 71. Object 71 and object 72 are fixed on stage 41. Movement device 42 includes a power source such as a motor and moves stage 41. As stage 41 moves, object 71 and object 72 also move. In FIG. 1, movement device 42 linearly moves stage 41 along a direction orthogonal to a paper surface of FIG. 1. Laser machining system 1 of FIG. 1 irradiates object 71 with laser beam L1 in synchronization with the movement of stage 41, whereby object 71 and object 72 are joined by laser welding.

1-2-4. Processing Device

In FIG. 1, processing device 5 is connected to laser irradiation system 2, measurement system 3, and movement system 4. Processing device 5 controls overall laser machining system 1. Processing device 5 has a function of executing synchronous control of laser oscillator 21, adjustment device 36, and movement device 42, and performing arithmetic processing of a detection signal from detection signal amplifier 32.

As illustrated in FIG. 2, processing device 5 executes machining processing S1, measuring processing S2, and evaluating processing S3. Processing device 5 can be realized, for example, by a computer system including one or more processors (microprocessors) and one or more memories. Machining processing S1, measuring processing S2, and evaluating processing S3 are realized by executing programs (stored in one or more memories) by one or more processors. Although the programs are pre-recorded in one or more memories, the programs may be provided by being recorded in a non-temporary recording medium such as a memory card or through a telecommunication line such as the Internet.

1-2-4-1. Machining Processing

Figure 4:
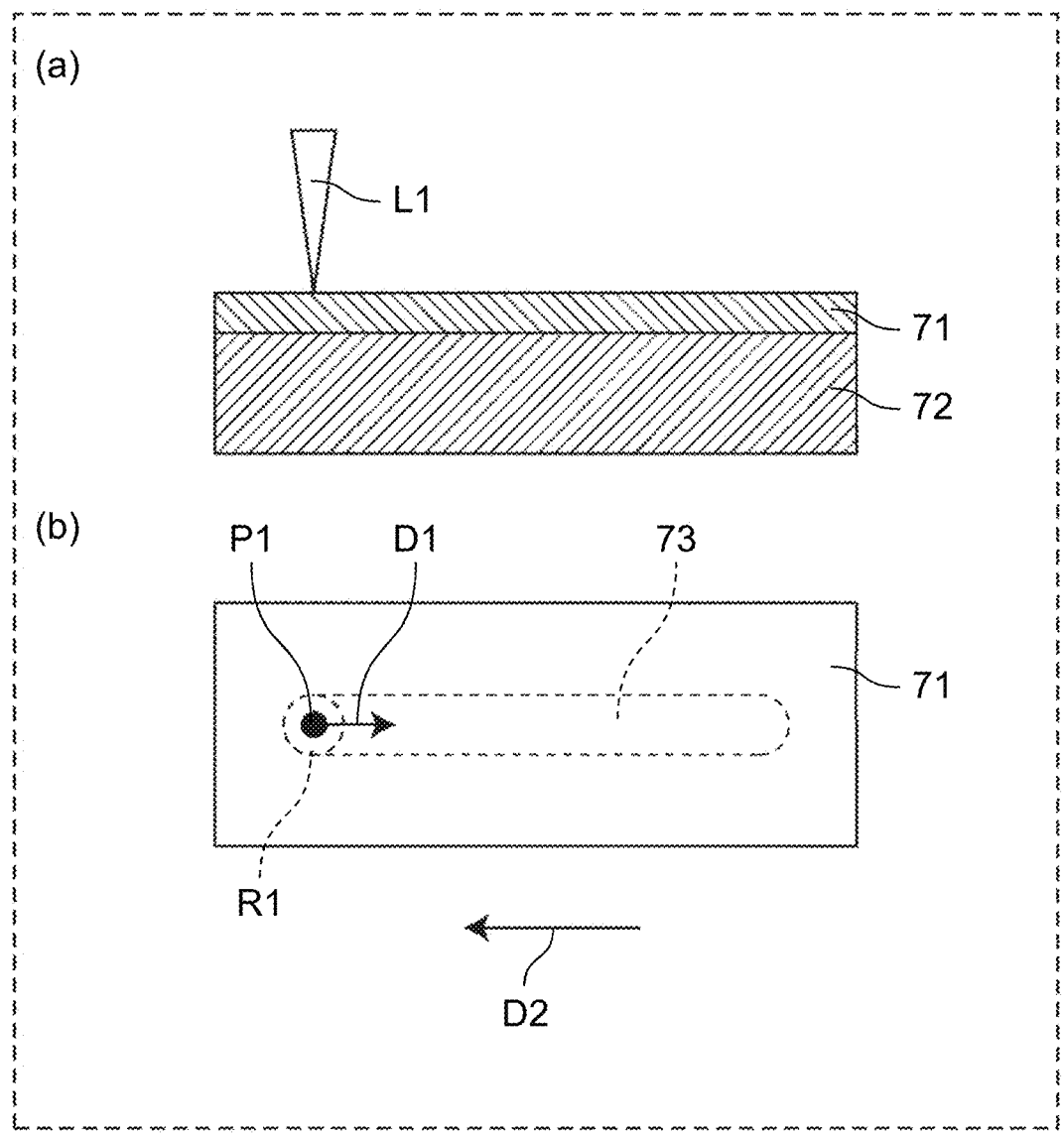
FIG. 4 is an explanatory view of an appearance of the object before machining processing illustrated in FIG. 2.

As illustrated in FIG. 3, machining processing S1 performs machining of object 71 by moving irradiation region R1 of laser beam L1 from laser oscillator 21 to object 71, relative to object 71. FIG. 4 is an explanatory view of an appearance of object 71 before machining processing S1 illustrated in FIG. 3. (a) of FIG. 4 and (b) of FIG. 4 respectively illustrate a cross section and a plan view of object 71 before machining processing S1. As illustrated in (b) of FIG. 4, object 71 is set with planned melting region 73 for melt-joining object 71 and object 72.

In machining processing S1, irradiation region R1 is moved relative to object 71 so that object 71 melts in planned melting region 73. In machining processing S1, irradiation region R1 is moved relative to object 71 by moving stage 41 by movement system 4 to move objects 71 and 72. Moving direction D1 in which irradiation region R1 moves relative to object 71 is a direction opposite to moving direction D2 of stage 41. In FIG. 4, irradiation region R1 is a region centered on irradiation position P1 of laser beam L1 to object 71. Irradiation region R1 is, for example, a region where object 71 is melted by irradiating object 71 with laser beam L1. Irradiation region R1 is a circular region, and a diameter of irradiation region R1 is equal to a width of planned melting region 73.

Figure 5:
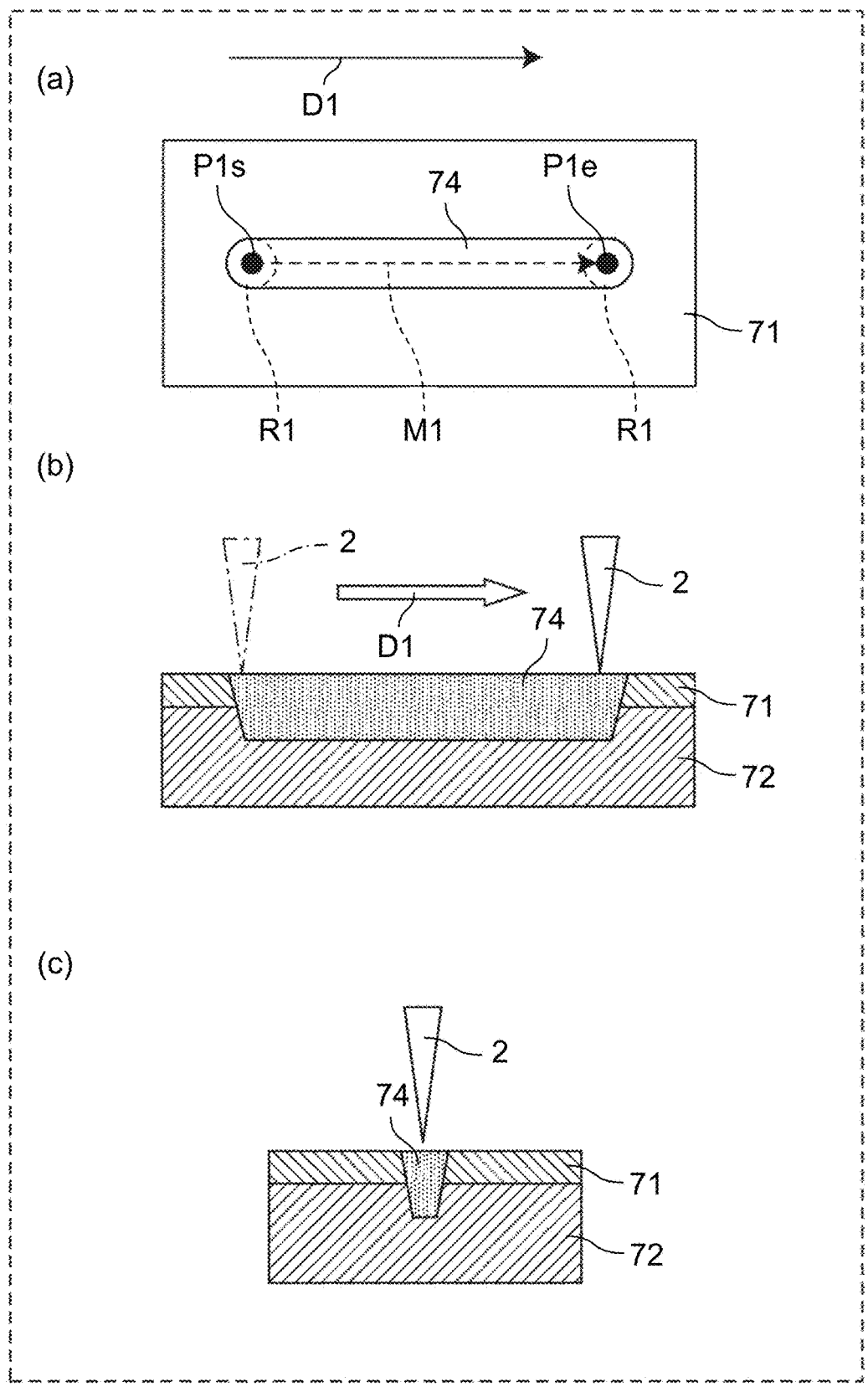
FIG. 5 is an explanatory view of the appearance of the object after the machining processing illustrated in FIG. 2.

FIG. 5 is an explanatory view of the appearance of the object after machining processing S1. (a) of FIG. 5 and (b) of FIG. 5 respectively illustrate a cross section and a plan view of object 71 after machining processing S1. (c) of FIG. 5 illustrates a cross section of object 71 after machining processing S1 in a plane orthogonal to moving direction D1. As illustrated in (a) of FIG. 5 and (b) of FIG. 5, in machining processing S1, irradiation region R1 is moved relative to object 71 from irradiation region R1 corresponding to first irradiation position P1s to irradiation region R1 corresponding to last irradiation position P1e. Therefore, as illustrated in (a) to (c) of FIG. 5, a portion corresponding to planned melting region 73 in objects 71 and 72 is melted, and melting portion 74 having a constant depth is formed. Movement path M1 of irradiation region R1 is determined by a shape of planned melting region 73. Planned melting region 73 is set such that a desired shape of melting portion 74 can be obtained. In FIG. 5, melting portion 74 is linear and movement path M1 is also linear.

Figure 6:
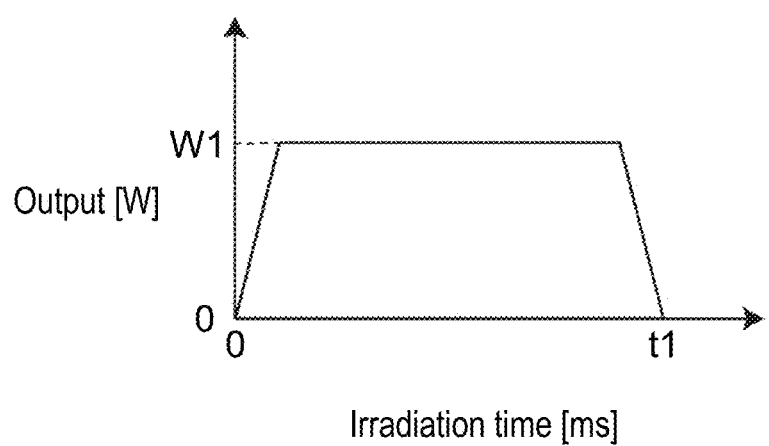
FIG. 6 is a graph illustrating an example of a relationship between an irradiation time and an output of a laser beam in the machining processing illustrated in FIG. 2.

FIG. 6 is a graph illustrating an example of a relationship between an irradiation time [ms] and an output [w] of laser beam L1 in machining processing S1. An output waveform of laser beam L1 is a trapezoidal waveform and includes a slow-up portion, a flat portion, and a slow-down portion. Output w1 of laser beam L1 in the flat portion is, for example, 400 W. Total irradiation time t1 of laser beam L1 is, for example, 4 ms. The slow-up portion and the slow-down portion are provided to prevent spatter and depression during laser welding. Since the output waveform of laser beam L1 is the trapezoidal waveform in this way, the shape of melting portion 74 is also an inverted trapezoidal shape as illustrated in (b) of FIG. 5. The moving speed at which movement system 4 moves stage 41 is 500 mm/s. A width of planned melting region 73 and melting portion 74 is about 300 μm. A depth of melting portion 74 is about 400 μm.

Figure 7:
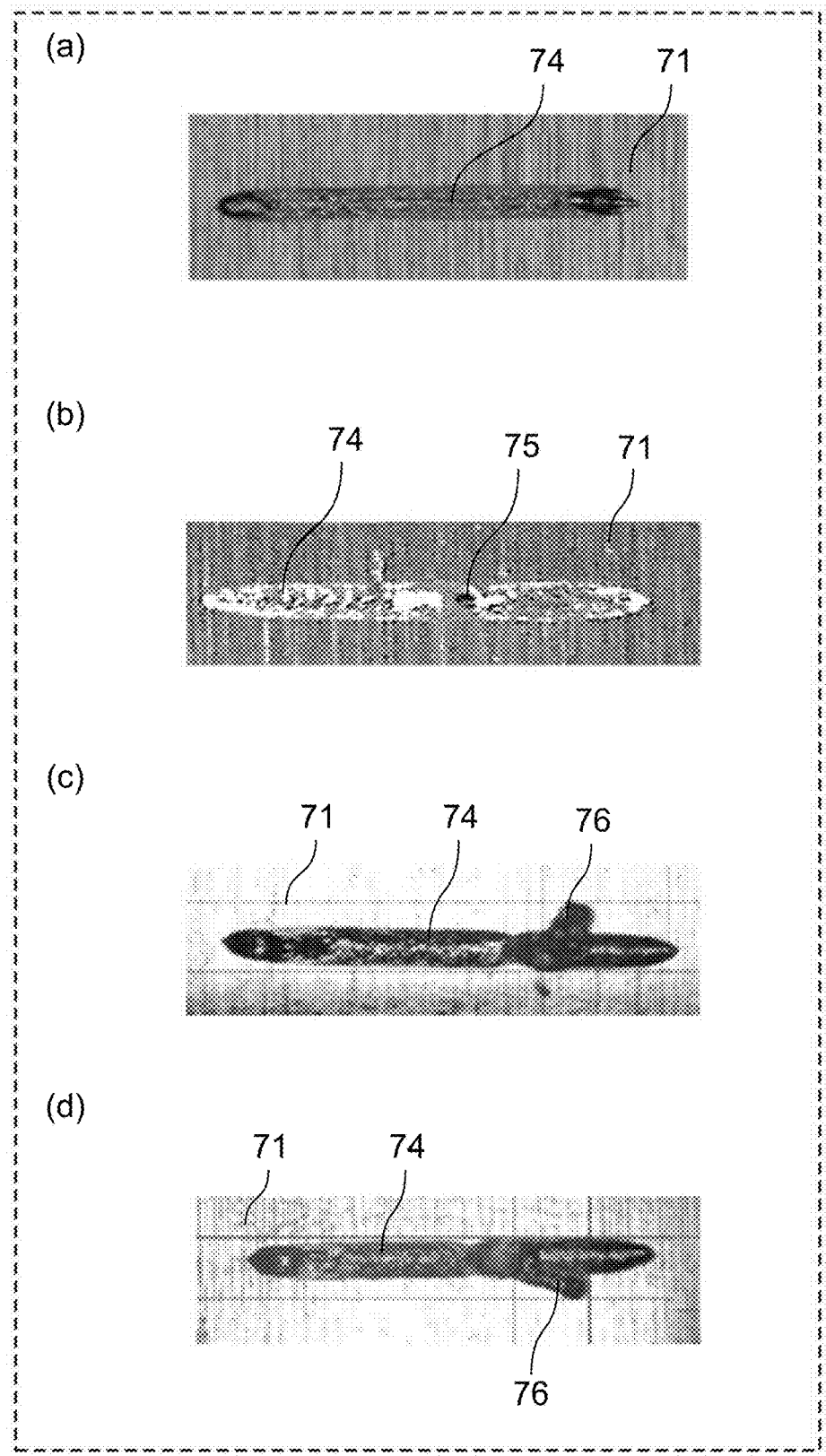
FIG. 7 is an actual photograph of the appearance of the object after the machining processing illustrated in FIG. 2.

FIG. 7 is an actual photograph of the appearance of object 71 after machining processing S1. In FIG. 7, object 71 is an aluminum plate having a thickness of 0.2 mm. Object 72 is an aluminum plate having a thickness of 1.0 mm.

(a) of FIG. 7 is a photograph of the appearance of object 71 in a normal state in a case where there is no abnormality in melting portion 74 of object 71. In the normal state, melting portion 74 has a certain width and has a shape that conforms to movement path M1 of irradiation region R1 of laser beam L1.

(b) of FIG. 7 is a photograph of the appearance of object 71 in an abnormal state in a case where there is an abnormality in melting portion 74 of object 71. In (b) of FIG. 7, abnormal portion 75 is generated near a center of melting portion 74. In (b) of FIG. 7, abnormal portion 75 is, for example, a hole. Abnormal portion 75 is caused by the perforation. In the perforation, a degree of melting is in an insufficient state, such that melting is not normally performed in a part of planned melting region 73, a hole is formed in object 71, or melting portion 74 is recessed. Abnormal portion 75 may be, for example, a protrusion, a recess, or the like in addition to the hole. In a case where such abnormal portion 75 is generated, a temperature in abnormal portion 75 becomes higher than that of melting portion 74, so that the intensity of light L2 also increases. Therefore, if there is an abnormal peak in the change in the intensity of light L2, it can be estimated that the abnormality is generated at the place where the peak is generated.

(c) of FIG. 7 is a photograph of the appearance of object 71 in an abnormal state in a case where there is an abnormality around melting portion 74 of object 71. In (c) of FIG. 7, abnormal portion 76 is generated on one side of melting portion 74 of object 71. Abnormal portion 76 is on one side (upper side of melting portion 74 in (c) of FIG. 7) with respect to melting portion 74 orthogonal to moving direction D1 of laser beam L1. Due to the presence of abnormal portion 76, the width of melting portion 74 becomes large in the vicinity of abnormal portion 76. Abnormal portion 76 is formed by melting object 71 outside planned melting region 73 due to excessive heat generation which is generated, for example, in a case where a foreign substance such as resin is present between object 71 and object 72.

(d) of FIG. 7 is a photograph of the appearance of object 71 in an abnormal state in a case where there is an abnormality around melting portion 74 of object 71. In (d) of FIG. 7, abnormal portion 76 is generated on the other side of melting portion 74 of object 71. Abnormal portion 76 is on the other side (lower side of melting portion 74 in (d) of FIG. 7) with respect to melting portion 74 orthogonal to moving direction D1 of laser beam L1. Due to the presence of abnormal portion 76, the width of melting portion 74 becomes large in the vicinity of abnormal portion 76. Abnormal portion 76 is formed by melting object 71 outside planned melting region 73 due to excessive heat generation which is generated, for example, in a case where a foreign substance such as resin is present between object 71 and object 72.

As described above, in the laser machining in machining processing S1, an abnormality may be generated. Therefore, laser machining system 1 of FIG. 1 executes an evaluation method for evaluating the machining in machining processing S1. The evaluation method includes a measurement step and an evaluation step. The measurement step corresponds to measuring processing S2 of FIG. 2. The evaluation step corresponds to evaluating processing S3 of FIG. 2.

1-2-4-2. Measuring Processing

As illustrated in FIG. 1, in measuring processing S2, the intensity of light L2 from object 71 due to the irradiation of laser beam L1 to object 71 is measured by using measurement system 3. Measuring processing S2 is executed in parallel with machining processing S1. As illustrated in FIG. 3, in measuring processing S2, measurement region R2 of photometer 31 is moved relative to object 71 to measure a change in the intensity of light L2 according to the movement of measurement region R2 by photometer 31. The position of measurement region R2 is based on a position of center P2 of measurement region R2. In FIG. 3, measurement region R2 moves relative to object 71 from first measurement region R2s to last measurement region R2e. In particular, in measuring processing S2, measurement region R2 is moved relative to object 71 so that movement path M2 of measurement region R2 has a plurality of intersections P3 with movement path M1 of irradiation region R1. In measuring processing S2, measurement region R2 is moved relative to object 71 so that measurement region R2 overlaps at least a part of irradiation region R1 at at least one of the plurality of intersections P3.

In measurement system 3 of laser machining system 1 of FIG. 1, adjustment device 36 can adjust the position of optical member 33 with respect to photometer 31. By adjusting the position of optical member 33 with respect to photometer 31, the position of measurement region R2 on object 71 can be adjusted.

Figure 8:
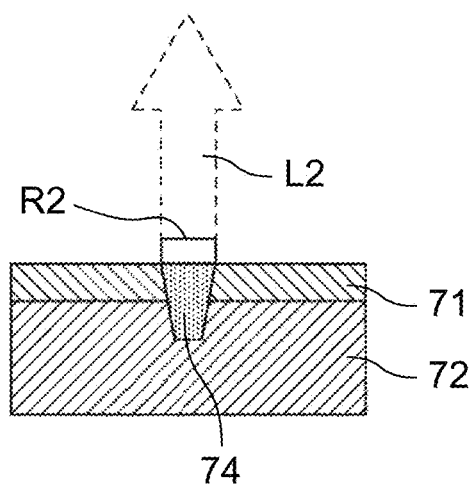
FIG. 8 is an explanatory view of an operation of a measurement system included in the laser machining system of FIG. 1.
Figure 9:
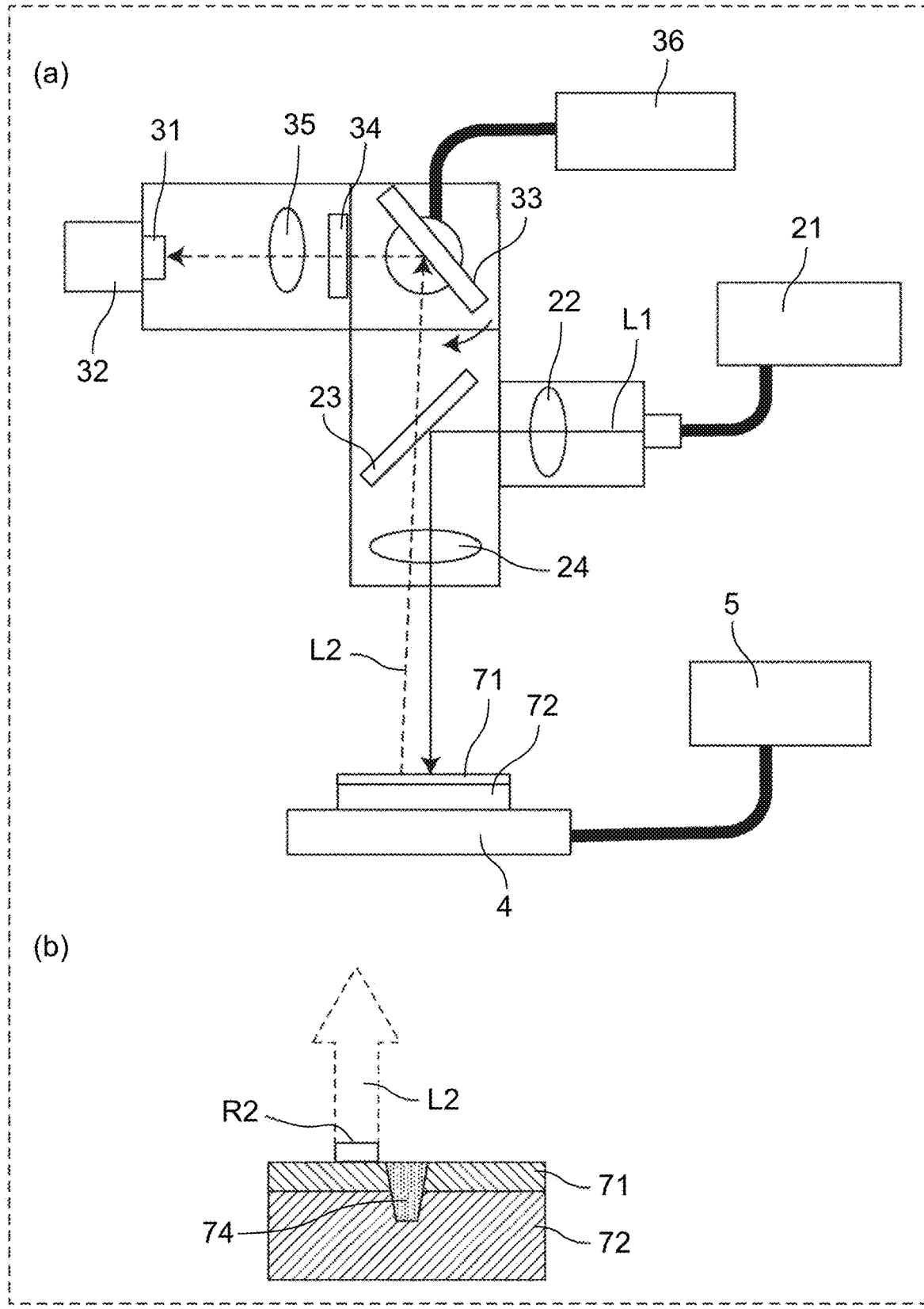
FIG. 9 is another explanatory view of the operation of the measurement system included in the laser machining system of FIG. 1.
Figure 10:
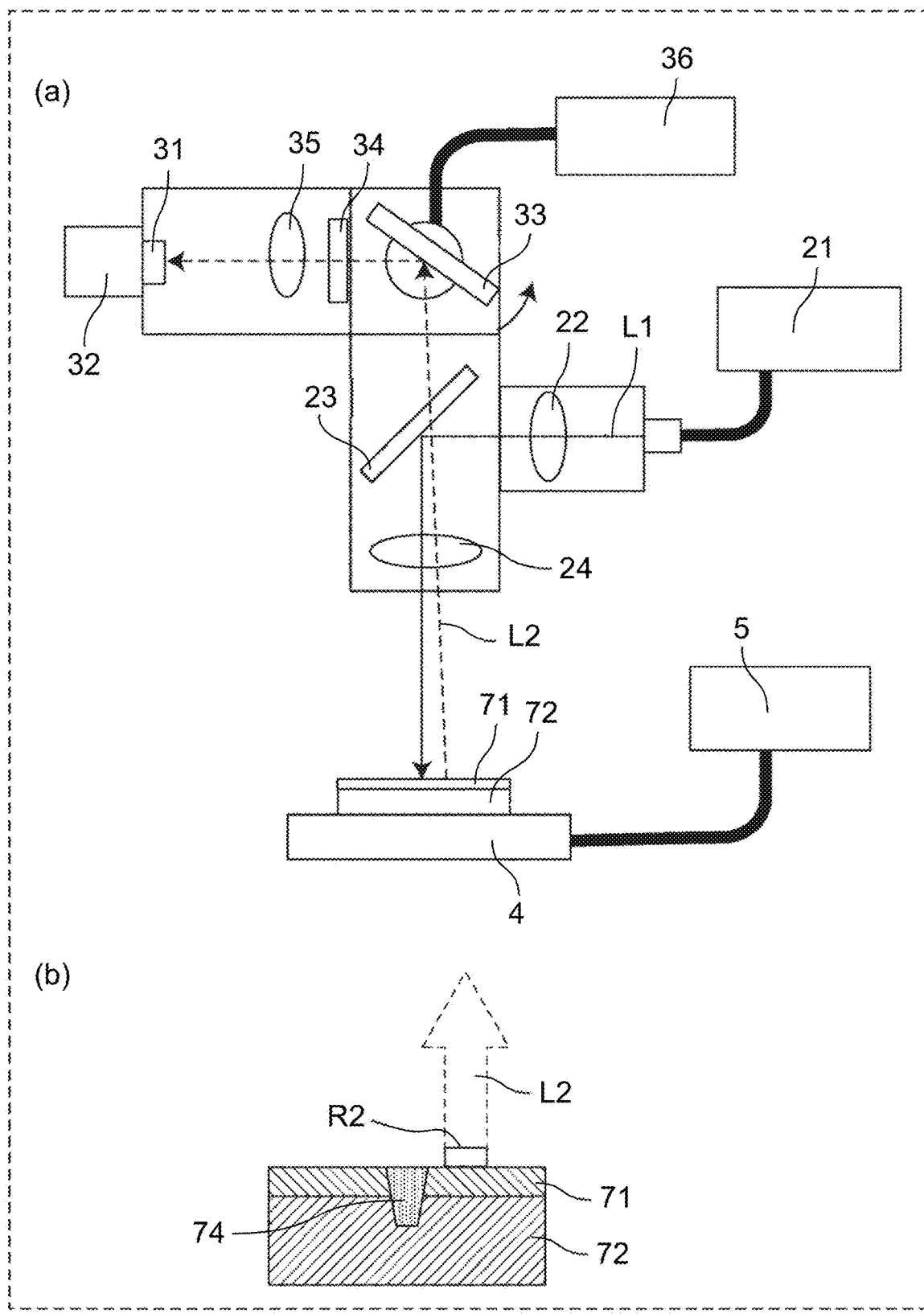
FIG. 10 is still another explanatory view of the operation of the measurement system included in the laser machining system of FIG. E

FIGS. 8 to 10 are explanatory views of an operation of measurement system 3. In (a) of FIG. 9 and (a) of FIG. 10, processing device 5 is not illustrated simply for the sake of simplification of the drawings. In FIGS. 8 to 10, a dimension of measurement region R2 is equal to a dimension of melting portion 74 in a width direction of melting portion 74.

FIG. 8 is an enlarged view of the vicinity of irradiation region R1 of laser beam L1 in object 71 in FIG. 1. In FIG. 1, optical member 33 is at a basic position with respect to photometer 31. At the basic position, a rotation angle of optical member 33 is set such that the optical axis of light L1 passing through condenser lens 24 coincides with the optical axis of laser beam L1 passing through condenser lens 24. That is, in a case where optical member 33 is at the basic position, measurement region R2 is on melting portion 74 and coincides with irradiation region R1. Therefore, photometer 31 can measure the intensity of light L2 from melting portion 74. In FIG. 3, measurement region R21 corresponds to a case where optical member 33 is at the basic position. Center P2 of measurement region R21 coincides with irradiation position P1 and intersection P3 of irradiation region R1.

In FIG. 9, optical member 33 is at a first position with respect to photometer 31. The first position is a position where optical member 33 is rotated clockwise from the basic position. At the first position, as illustrated in (a) of FIG. 9, a rotation angle of optical member 33 is set such that the optical axis of light L1 passing through condenser lens 24 has a predetermined first angle with respect to the optical axis of laser beam L1 passing through condenser lens 24. (b) of FIG. 9 is an enlarged view of the vicinity of irradiation region R1 of laser beam L1 in object 71 in (a) of FIG. 9. As illustrated in (b) of FIG. 9, for example, the predetermined first angle is set such that measurement region R2 is not located on melting portion 74 but on one side (left side in (b) of FIG. 9) in the width direction of melting portion 74. That is, in a case where optical member 33 is at the first position, measurement region R2 is not on melting portion 74 and does not overlap irradiation region R1. In this case, photometer 31 can measure the intensity of light L2 from a region on one side of melting portion 74 in the width direction. In FIG. 3, measurement region R22 corresponds to a case where optical member 33 is at the first position.

In FIG. 10, optical member 33 is at a second position with respect to photometer 31. The second position is a position where optical member 33 is rotated counterclockwise from the basic position. At the second position, as illustrated in (a) of FIG. 10, the rotation angle of optical member 33 is set such that the optical axis of light L1 passing through condenser lens 24 has a predetermined second angle with respect to the optical axis of laser beam L1 passing through condenser lens 24. (b) of FIG. 10 is an enlarged view of the vicinity of irradiation region R1 of laser beam L1 in object 71 in (a) of FIG. 10. As illustrated in (b) of FIG. 10, for example, the predetermined second angle is set such that measurement region R2 is not located on melting portion 74 but on the other side (right side in (b) of FIG. 10) of melting portion 74 in the width direction. That is, in a case where optical member 33 is at the second position, measurement region R2 is not on melting portion 74 and does not overlap irradiation region R1. In this case, photometer 31 can measure the intensity of light L2 from the region on the other side in the width direction of melting portion 74. In FIG. 3, measurement region R23 corresponds to a case where optical member 33 is at the second position.

As illustrated in FIGS. 8 to 10, in measuring processing S2, measurement region R2 is moved relative to object 71 by adjusting the position of optical member 33 with respect to photometer 31 by adjustment device 36 of measurement system 3.

In measuring processing S2, in moving direction D1 of irradiation region R1 illustrated in (a) of FIG. 5 and (b) of FIG. 5, measurement region R2 is moved relative to object 71 so that measurement region R2 overlaps at least a part of irradiation region R1. In laser machining system 1 of FIG. 1, movement system 4 moves object 71 together with stage 41 in moving direction D2. Measurement region R2 coincides with irradiation region R1 in moving direction D2. Therefore, movement system 4 only moves object 71 in moving direction D2 together with stage 41 so as to be a result in which measurement region R2 is moved relative to object 71 in moving direction D1 in a state of coinciding with irradiation region R1.

On the other hand, in measuring processing S2, measurement region R2 reciprocates relative to object 71 based on movement path M1 of irradiation region R1 in a defined direction intersecting moving direction D1 of irradiation region R1. The defined direction is, for example, a direction orthogonal to moving direction D1 and is the width direction (left-right direction in (c) of FIG. 5) of melting portion 74 illustrated in (c) of FIG. 5. In measuring processing S2, adjustment device 36 causes optical member 33 to reciprocate between the first position illustrated in FIG. 9 and the second position illustrated in FIG. 10. The basic position is an intermediate position between the first position and the second position. Therefore, measurement region R2 reciprocates relative to object 71 in the defined direction based on movement path M1 of irradiation region R1.

During the reciprocating movement of measurement region R2 by adjustment device 36, movement system 4 moves object 71 in moving direction D2 together with stage 41. Therefore, as illustrated in FIG. 3, measurement region R2 moves relative to object 71 so that movement path M2 of measurement region R2 meanders. In this way, as illustrated in FIG. 3, in measuring processing S2, measurement region R2 is moved relative to object 71 so that movement path M2 of measurement region R2 meanders. In moving direction D1 of irradiation region R1, measurement region R2 coincides with irradiation region R1, and when optical member 33 is at the basic position, measurement region R2 coincides with irradiation region R1 also in the direction orthogonal to moving direction D1 of irradiation region R1. Therefore, at each of the plurality of intersections P3 between movement path M2 of measurement region R2 and movement path M1 of irradiation region R1, measurement region R2 overlaps irradiation region R1.

Figure 11:
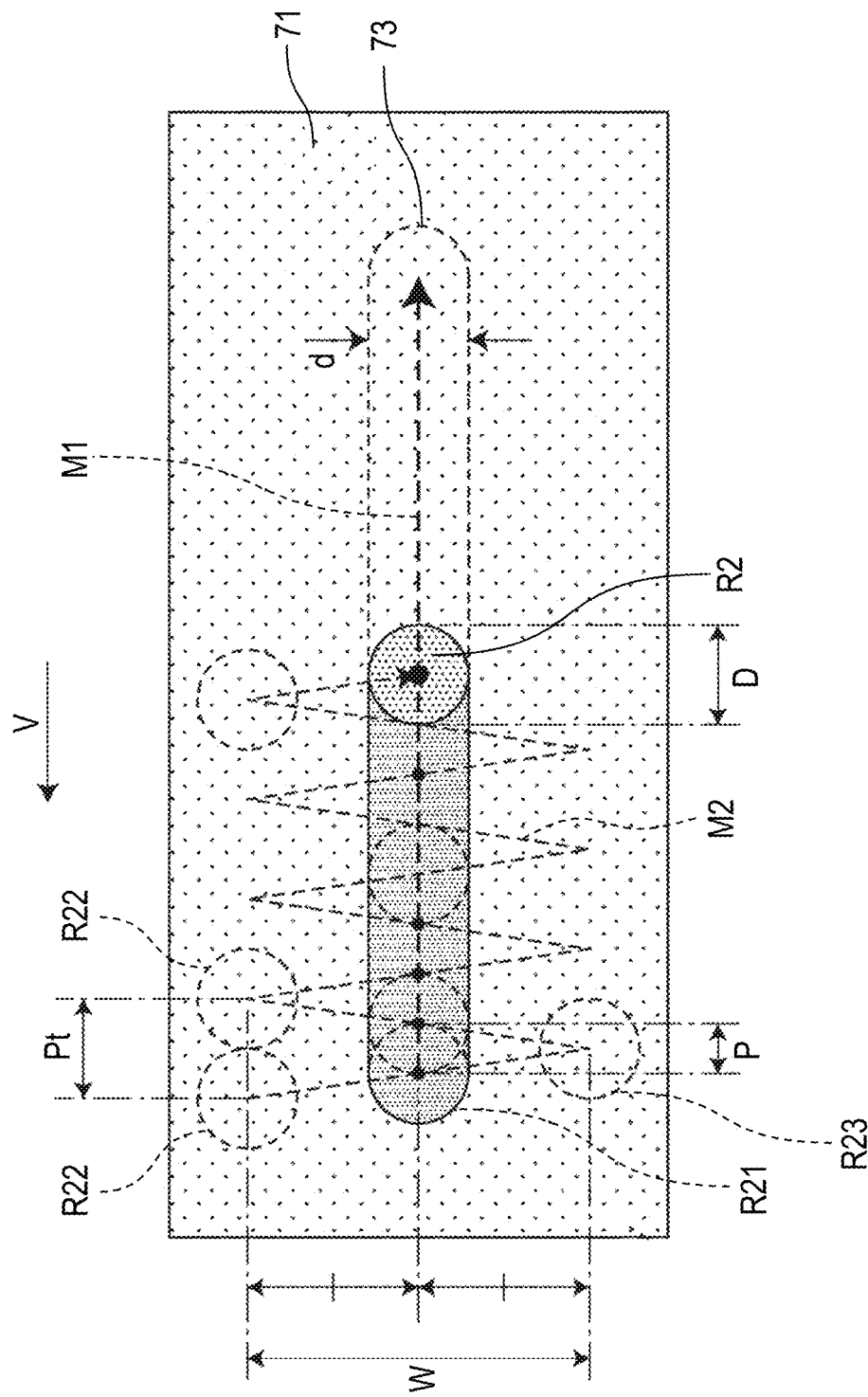
FIG. 11 is an explanatory view of an example of how to set a movement path of a measurement region in the measuring processing illustrated in FIG. 2.

FIG. 11 is an explanatory view of an example of how to set movement path M2 of measurement region R1 in measuring processing S2. FIG. 11 illustrates a state of object 71 in the middle of the laser machining.

As illustrated in FIG. 11, in measuring processing S2, measurement region R2 reciprocates with predetermined width W [mm] in the defined direction (vertical direction in FIG. 11) that coincides with the width direction of melting portion 74. Predetermined width W is a scanning width of measurement region R2. Predetermined width W is a width of movement path M2 in the defined direction. Predetermined width W is a distance between measurement region R22 and measurement region R23 in the defined direction.

Predetermined width W is set so as to enable evaluation of a state around melting portion 74 of object 71 in the width direction of melting portion 74 of object 71. Predetermined width W is set such that, for example, the intensity of light L2 can be evaluated at least in regions on both sides of melting portion 74 in the width direction. When the width of melting portion 74 is defined as d [mm], predetermined width W is set so as to satisfy W≥2×d. The width of melting portion 74 is equal to the width of planned melting region 73 of object 71 by irradiating object 71 with laser beam L1.

On the other hand, in movement path M2 of measurement region R2, a scanning pitch at melting portion 74 is defined as P [mm], and an end pitch at an end of the reciprocating movement of measurement region R2 is defined as Pt [mm]. Scanning pitch P is a distance between centers P2 of measurement regions R21 when optical member 33 is at the basic position. End pitch Pt is a distance between centers P2 of measurement regions R22 in a case where optical member 33 is at the first position, or a distance between centers P2 of measurement regions R23 in a case where optical member 33 is at the second position.

A moving speed of irradiation region R1 is defined as V [mm/s], and a reciprocation frequency of measurement region R2 in the defined direction is defined as F [Hz]. Moving speed V is a speed of stage 41 by movement system 4. Frequency F is a reciprocation frequency of optical member 33 by adjustment device 36 of measurement system 3. Frequency F is, for example, a reciprocal of a time required for optical member 33 to move from the first position and return to the first position again.

In this case, scanning pitch P is P=V/(F/2). End pitch Pt is Pt=P/2. Therefore, end pitch Pt is Pt=V/F.

End pitch Pt is set so as to enable evaluation of entire melting portion 74 of object 71 in moving direction D1 of irradiation region R1. When the dimension of measurement region R2 in moving direction D1 of irradiation region R1 is defined as D [mm], end pitch Pt is set so as to satisfy Pt≤D.

From the above points, reciprocation frequency F in the defined direction of measurement region R2 is set so as to satisfy F≥V/D.

As described above, by setting width W and frequency F of movement path M2, an evaluation of the overall state of melting portion 74 in moving direction D1 of irradiation region R1 and an evaluation of a state around melting portion 74 of object 71 in the defined direction intersecting moving direction D1 of irradiation region R1 can be performed.

In laser machining system 1, when a size of measurement region R2 is defined as dm [mm], it is represented by dm=ds×f1/f2. In FIG. 11, measurement distance R2 is in a circular region. The size of measurement region R2 is equal to a diameter of measurement region R2. That is, dm=D. Here, ds [mm] is a size of a light receiver of photometer 31. The light receiver is, for example, circular. The size of the light receiver is equal to the diameter of the light receiver. f1 [mm] is a focal length of condenser lens 24. f2 [mm] is a focal length of imaging lens 35 with respect to photometer 31.

As described above, size dm of measurement region R2 is set by size ds of the light receiver of photometer 31, focal length f1 of condenser lens 24, and focal length f2 of imaging lens 35 with respect to photometer 31. By adjusting ds, f1, and f2, size dm of measurement region R2 can be adjusted. In FIG. 11, size dm of measurement region R2 is equal to width d of melting portion 74. For example, in a case where width d of melting portion 74 is 300 μm, size ds of the light receiver of photometer 31 may be set to 300 μm, f1 to 100 mm, and f2 to 100 μm.

As illustrated in FIG. 3, in measuring processing S2 described above, measurement region R2 is moved relative to object 71 from first measurement region R2s to last measurement region R2e. Photometer 31 outputs a detection signal indicating the intensity of light L2 from measurement region R2. The detection signal from photometer 31 is amplified by detection signal amplifier 32 and input to processing device 5. As illustrated in FIG. 3, processing device 5 acquires a measurement waveform indicating a change in the intensity of the detection signal with respect to an elapsed time. The elapsed time corresponds to a distance in which measurement region R2 travels along movement path M2. Measuring processing S2 is executed in parallel with machining processing S1. That is, since measurement region R2 reciprocates in the direction perpendicular to moving direction D1 of irradiation region R1 while performing laser machining, the intensity of light L2 from measurement region R2 is maximized when passing through melting portion 74, is weakened as a distance from melting portion 74 increases, and is minimized at an outermost portion. Therefore, the measurement waveform is a substantially sinusoidal waveform as illustrated in FIG. 3. FIG. 3 illustrates a measurement waveform obtained in measuring processing S2 in a case where there is no abnormality in melting portion 74 of object 71.

More specifically, in FIG. 3, ts corresponds to first measurement region R2s. Measurement region R2s is at the same position as measurement region R22 in the width direction of melting portion 74. Measurement region R22 is farthest from melting portion 74 and does not coincide with irradiation region R1. Therefore, at ts, the signal intensity is the minimum value. t11, t12, t13, and t14 respectively correspond to measurement regions R21, R23, R21, and R22. Measurement region R21 coincides with irradiation region R1 on melting portion 74. Therefore, at t11 and t13, the signal intensity is the maximum value. Measurement regions R22 and R23 are farthest from melting portion 74 and do not coincide with irradiation region R1. Therefore, at t12 and t14, the signal intensity is the minimum value. te corresponds to last measurement region R2e. Since measurement region R2e is at the same position as measurement region R23 in the width direction of melting portion 74, the signal intensity is the minimum value at te. As described above, the change in the intensity of the detection signal with respect to the elapsed time corresponds to the change in the intensity of light L2 according to the movement of measurement region R2 measured in measuring processing S2. The measurement waveform of FIG. 3 includes normal melting waveform A1 and normal unmelting waveform A2. Normal melting waveform A1 indicates the change in the signal intensity near the maximum value in the change in the intensity of light L2 according to the movement of measurement region R2. The signal intensity is maximized in measurement region R21 in a case where optical member 33 is at the basic position, and measurement region R21 corresponds to melting portion 74 of object 71. Therefore, normal melting waveform A1 indicates the waveform of the intensity of light L2 from melting portion 74 at the normal state. Normal unmelting waveform A2 illustrates a change in the signal intensity near the minimum value in the change in the intensity of light L2 according to the movement of measurement region R2. The signal intensity is minimized in measurement regions R22 and R23 in a case where optical member 33 is at the first position or the second position, and measurement regions R22 and R23 correspond to the unmelting portions which are not melted in object 71. Therefore, normal unmelting waveform A2 indicates the waveform of the intensity of light L2 from the unmelting portion at the normal state.

Figure 12:
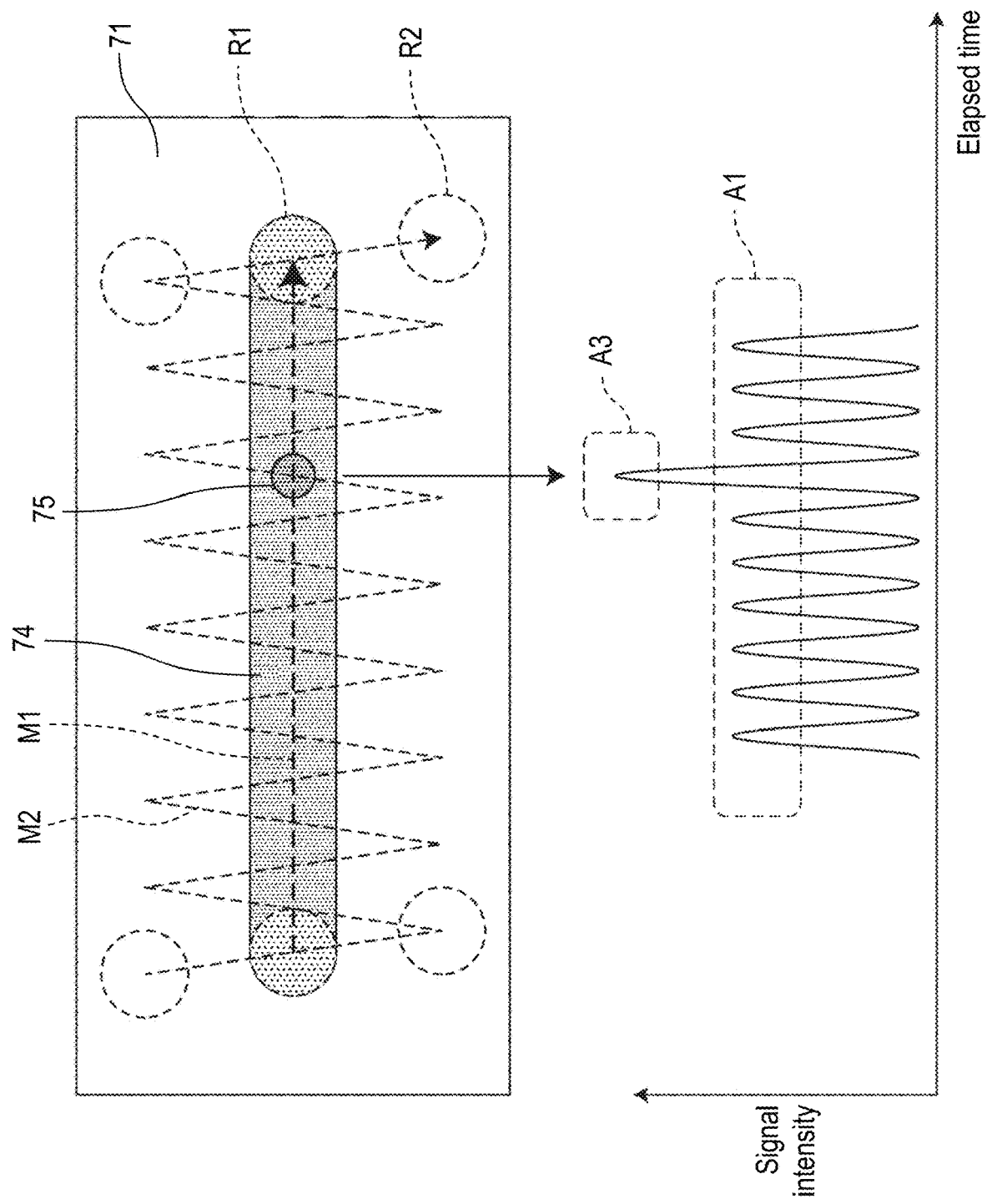
FIG. 12 is an explanatory view illustrating a relationship between a measurement waveform obtained in the measuring processing illustrated in FIG. 2 and the object in a case where there is an abnormality in the melting portion of the object.
Figure 13:
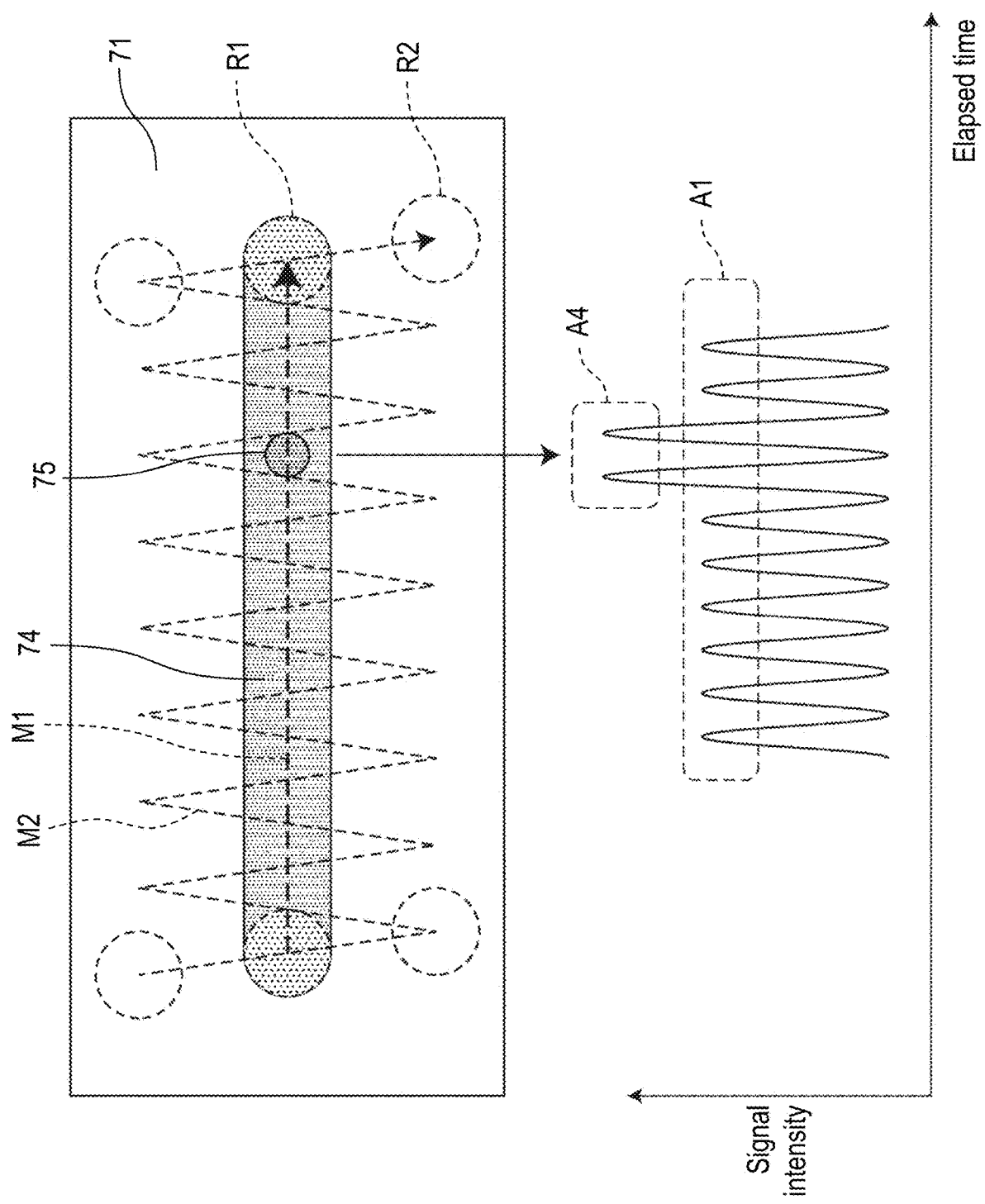
FIG. 13 is another explanatory view illustrating a relationship between the measurement waveform obtained in the measuring processing illustrated in FIG. 2 and the object in a case where there is an abnormality in the melting portion of the object.

Next, the measurement waveform obtained in measuring processing S2 in a case where there is an abnormality in melting portion 74 of object 71 will be described with reference to FIGS. 12 and 13. FIGS. 12 and 13 are explanatory views illustrating a relationship between the measurement waveform obtained in measuring processing S2 and object 71 in a case where abnormal portion 75 is generated near the center of melting portion 74 similar to (b) of FIG. 7.

In FIG. 12, measurement region R2 has passed abnormal portion 75 once. The measurement waveform of FIG. 12 includes abnormal melting waveform A3 at the time when abnormal portion 75 is generated. Abnormal melting waveform A3 indicates a change in the signal intensity caused by abnormal portion 75 which is an abnormality of melting portion 74. In FIG. 12, abnormal melting waveform A3 includes one peak. One peak of abnormal melting waveform A3 is larger than the peak of normal melting waveform A1.

In FIG. 13, measurement region R2 has passed through abnormal portion 75 twice. The measurement waveform of FIG. 13 includes abnormal melting waveform A4 including two peaks in the vicinity of the time when abnormal portion 75 is generated. The two peaks of abnormal melting waveform A4 are larger than the peak of normal melting waveform A1. Abnormal melting waveform A4 indicates a change in the signal intensity caused by abnormal portion 75 which is an abnormality of melting portion 74.

Next, the measurement waveform obtained in measuring processing S2 in a case where there is an abnormality around melting portion 74 of object 71 will be described with reference to FIGS. 14 to 16.

Figure 14:
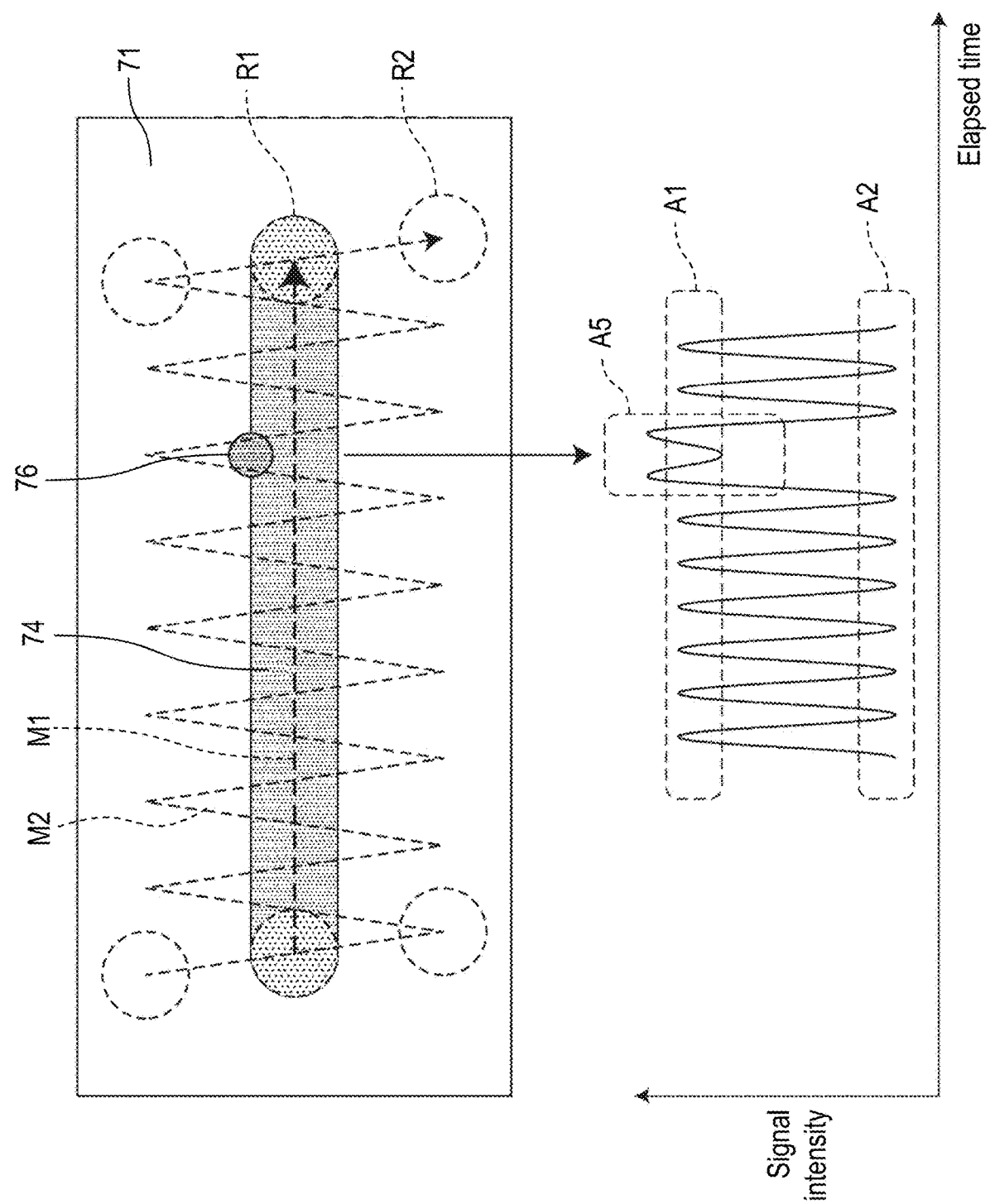
FIG. 14 is an explanatory view illustrating a relationship between a measurement waveform obtained in the measuring processing illustrated in FIG. 2 and the object in a case where there is an abnormality on one side of the melting portion of the object.

FIG. 14 is an explanatory view illustrating a relationship between the measurement waveform obtained in measuring processing S2 and object 71 in a case where abnormal portion 76 is generated on one side of melting portion 74 of object 71 similar to (c) of FIG. 7. In FIG. 14, measurement region R2 passes through abnormal portion 76 through melting portion 74, and then passes through melting portion 74 through abnormal portion 76 again. In FIG. 14, measurement region R2 has passed through abnormal portion 76 twice, and a time interval between a first passage of abnormal portion 76 and a second passage of abnormal portion 76 is shorter than the time corresponding to scanning pitch P. The measurement waveform of FIG. 14 includes an abnormal melting waveform A5 including two peaks in the vicinity of the time when abnormal portion 76 is generated. The two peaks of abnormal melting waveform A5 are larger than the peak of normal melting waveform A1. The signal intensity of a valley of the two peaks of abnormal melting waveform A5 is larger than the signal intensity of a valley of the peaks of normal unmelting waveform A2. Such abnormal melting waveform A5 indicates a change in the signal intensity caused by abnormal portion 76 which is an abnormality of melting portion 74. Abnormal melting waveform A5 is different from normal melting waveform A1 and normal unmelting waveform A2 as described above. Abnormal melting waveform A5 is also different from abnormal melting waveforms A3 and A4 corresponding to a case where abnormal portion 75 is generated near the center of melting portion 74. Therefore, it is possible to distinguish between a case where abnormal portion 76 is generated on one side of melting portion 74 of object 71 and a case where abnormal portion 75 is generated near the center of melting portion 74.

Figure 15:
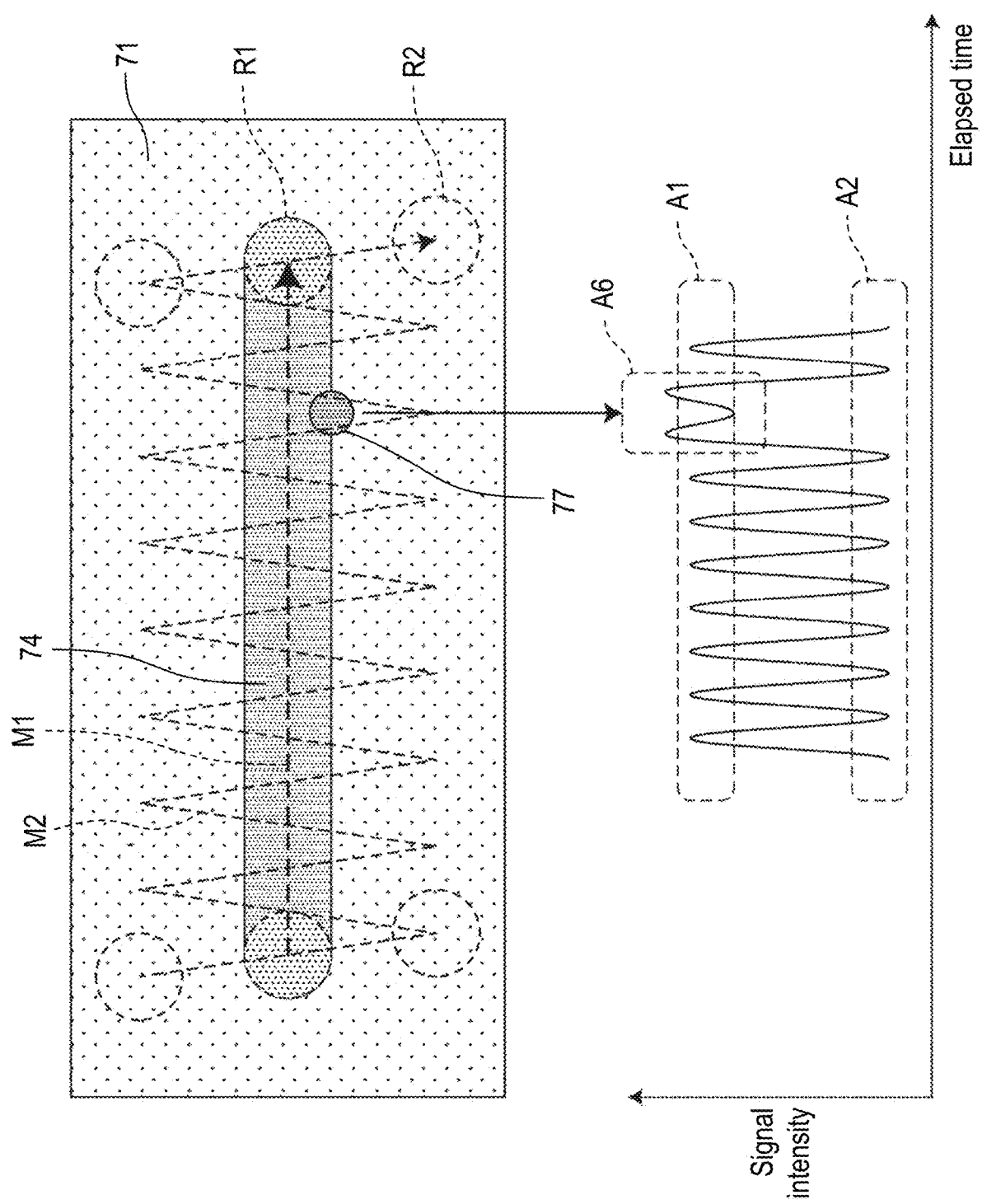
FIG. 15 is an explanatory view illustrating a relationship between the measurement waveform obtained in the measuring processing illustrated in FIG. 2 and the object in a case where there is an abnormality on the other side of the melting portion of the object.

FIG. 15 is an explanatory view illustrating a relationship between the measurement waveform obtained in measuring processing S2 and object 71 in a case where abnormal portion 77 is generated on the other side of melting portion 74 of object 71 similar to (d) of FIG. 7. In FIG. 15, measurement region R2 passes through abnormal portion 77 through melting portion 74, and then passes through melting portion 74 through abnormal portion 77 again. In FIG. 15, measurement region R2 has passed through abnormal portion 77 twice, and a time interval between the first passage of abnormal portion 77 and the second passage of abnormal portion 77 is shorter than the time corresponding to scanning pitch P. The measurement waveform of FIG. 15 includes abnormal melting waveform A6 including two peaks in the vicinity of the time when abnormal portion 77 is generated. The two peaks of abnormal melting waveform A6 are larger than the peak of normal melting waveform A1. The signal intensity of a valley of the two peaks of abnormal melting waveform A6 is larger than the signal intensity of a valley of the peaks of normal unmelting waveform A2. Such an abnormal melting waveform A6 illustrates a change in the signal intensity caused by abnormal portion 77, which is an abnormality of melting portion 74. Abnormal melting waveform A6 is different from normal melting waveform A1 and normal unmelting waveform A2 as described above. Abnormal melting waveform A6 is also different from the abnormal melting waveforms A3 and A4 corresponding to a case where abnormal portion 75 is generated near the center of melting portion 74. Therefore, it is possible to distinguish between a case where abnormal portion 77 is generated on the other side of melting portion 74 of object 71 and a case where abnormal portion 75 is generated near the center of melting portion 74.

Abnormal melting waveform A5 of FIG. 14 corresponds to a case where abnormal portion 76 is generated on one side of melting portion 74 of object 71, and abnormal melting waveform A6 of FIG. 15 corresponds to a case where abnormal portion 77 is generated on the other side of melting portion 74 of object 71. Abnormal melting waveform A5 of FIG. 14 and abnormal melting waveform A6 of FIG. 15 respectively correspond to the abnormal portions 76 and 77 at different locations, but have substantially the same shape. In order to determine which of abnormal melting waveforms A5 and A6 the waveform observed in a predetermined period corresponds to, the moving direction of optical member 33 in the predetermined period can be used. In a case where the moving direction of optical member 33 in the predetermined period changes from a direction from the basic position to the first position to a direction from the first position to the basic position, measurement region R2 is on one side of melting portion 74. Therefore, the waveform observed in the predetermined period is abnormal melting waveform A5. In a case where the moving direction of optical member 33 in the predetermined period changes from a direction from the basic position to the second position to a direction from the second position to the basic position, measurement region R2 is on the other side of melting portion 74. Therefore, the waveform observed in the predetermined period is abnormal melting waveform A6.

Figure 16:
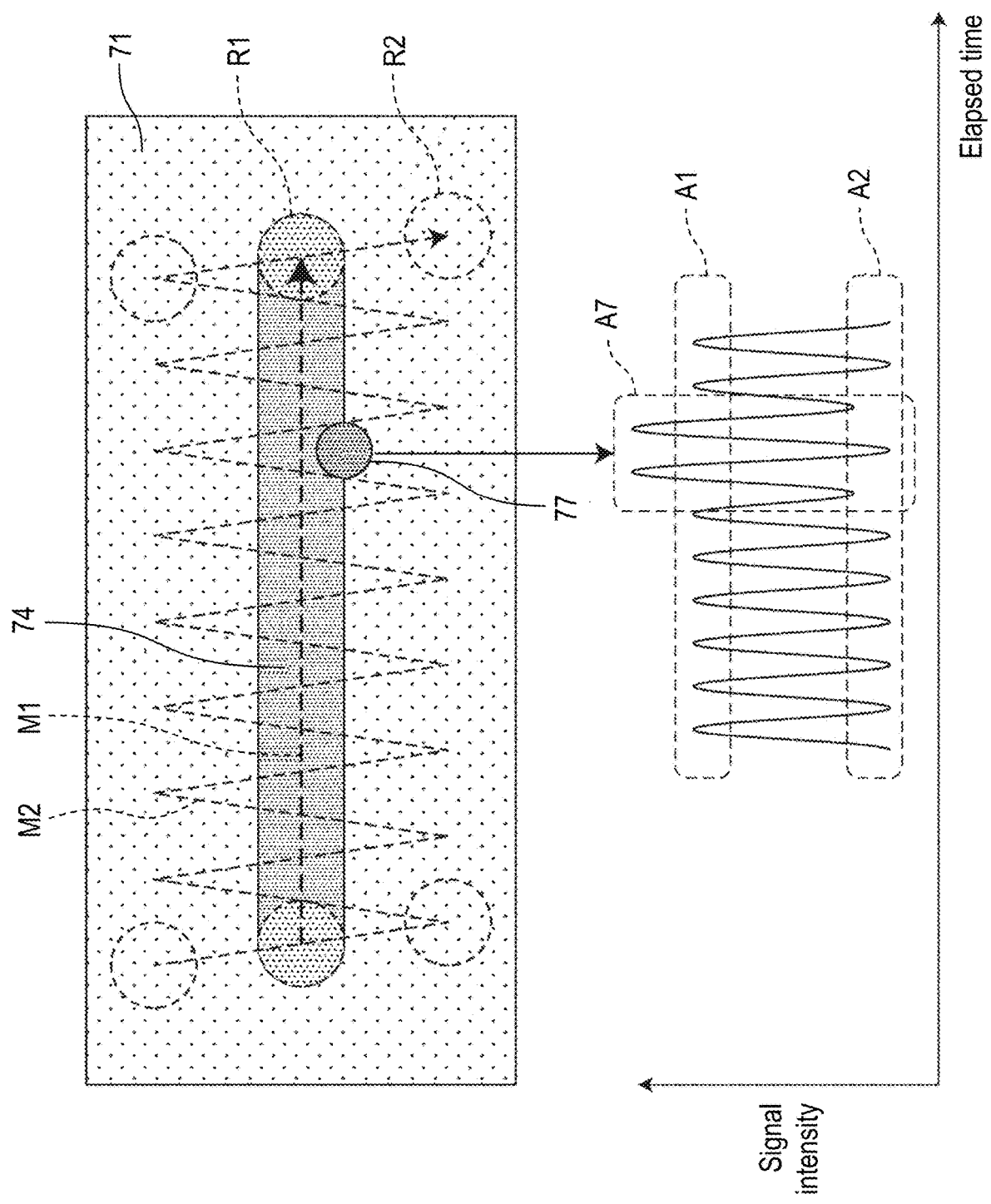
FIG. 16 is another explanatory view illustrating a relationship between the measurement waveform obtained in the measuring processing illustrated in FIG. 2 and the object in a case where there is an abnormality on the other side of the melting portion of the object.

FIG. 16 is an explanatory view illustrating a relationship between the measurement waveform obtained in measuring processing S2 and object 71 in a case where abnormal portion 77 is generated on the other side of melting portion 74 of object 71 similar to (d) of FIG. 7. In FIG. 16, measurement region R2 passes through melting portion 74 through abnormal portion 77, and then passes through abnormal portion 77 through melting portion 74 again. In FIG. 16, measurement region R2 has passed through abnormal portion 77 twice, and a time interval between the first passage of abnormal portion 77 and the second passage of abnormal portion 77 is longer than the time corresponding to scanning pitch P. The measurement waveform of FIG. 16 includes abnormal melting waveform A7 including two peaks in the vicinity of the time when abnormal portion 77 is generated. The two peaks of abnormal melting waveform A7 are larger than the peak of normal melting waveform A1. The signal intensity of the valley of the two peaks of abnormal melting waveform A7 is equal to the signal intensity of the valley of the peaks of normal unmelting waveform A2. The signal intensity of the valley opposite to the valley of the two peaks of abnormal melting waveform A7 is larger than the signal intensity of the valley of the peaks in normal unmelting waveform A2. Such abnormal melting waveform A7 indicates a change in the signal intensity caused by abnormal portion 77 which is an abnormality of melting portion 74. Abnormal melting waveform A7 is different from normal melting waveform A1 and normal unmelting waveform A2 as described above. Abnormal melting waveform A7 is also different from the abnormal melting waveforms A3 and A4 corresponding to a case where abnormal portion 75 is generated near the center of melting portion 74. Therefore, it is possible to distinguish between a case where abnormal portion 77 is generated on the other side of melting portion 74 of object 71 and a case where abnormal portion 75 is generated near the center of melting portion 74.

According to measuring processing S2 described above, it is possible to obtain a measurement waveform indicating the change in the intensity of light L2 according to the movement of measurement region R2. The measurement waveform is different from a case where there is no abnormality in melting portion 74 of object 71 illustrated in FIG. 3, and as illustrated in FIGS. 12 to 16, includes abnormal melting waveforms A3, A4, A5, A6, and A7 in a case where there is an abnormality in melting portion 74 of object 71. Therefore, by analyzing the measurement waveform (change in the intensity of light L2 according to the movement of measurement region R2) obtained in measuring processing S2, it is possible to detect the abnormality of melting portion 74 and evaluate the laser machining. It is possible to evaluate at which position of object 71 the abnormal portion is generated based on the position of measurement region R2 in the vicinity of the time when the abnormality is generated.

Figure 17:
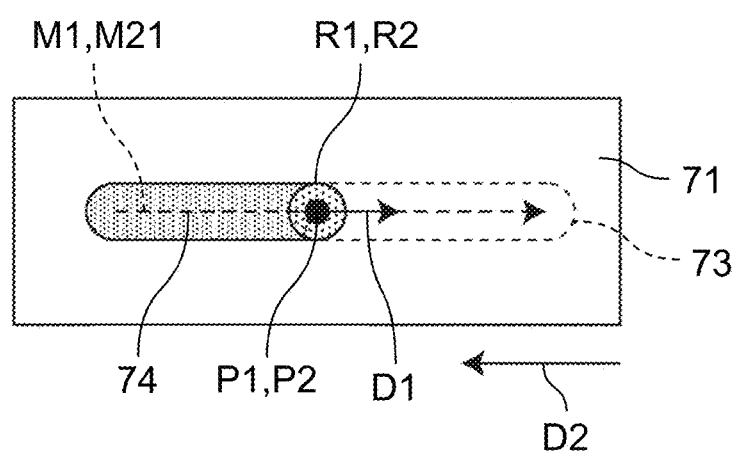
FIG. 17 is an explanatory view of how to move a measurement region in a measuring processing of Comparative Example 1.

In order to confirm advantages of measuring processing S2 of the present exemplary embodiment, measuring processing of Comparative Example 1 will be described with reference to FIG. 17. In order to simplify the description, a case where laser machining system 1 of FIG. 1 executes the measuring processing of Comparative Example 1 will be described below. FIG. 17 is an explanatory view of how to move measurement region R2 in the measuring processing of Comparative Example 1. FIG. 17 illustrates a state of object 71 in the middle of laser machining. In the measuring processing of Comparative Example 1, measurement system 3 is used to measure the intensity of light L2 from object 71 caused by the irradiation of laser beam L1 to object 71. In the measuring processing of Comparative Example 1, as illustrated in FIG. 17, measurement region R2 of photometer 31 is moved relative to object 71, and the change in the intensity of light L2 according to the movement of measurement region R2 is measured by photometer 31. In FIG. 17, in the measuring processing of Comparative Example 1, measurement region R2 is moved relative to object 71 so that movement path M21 of measurement region R2 coincides with movement path M1 of irradiation region R1.

Figure 18A:
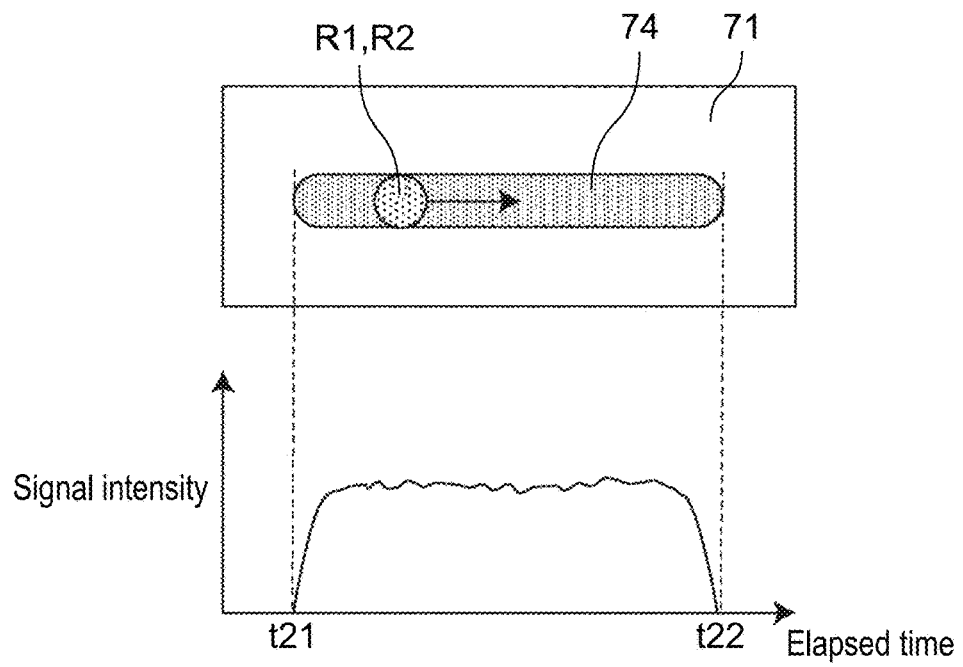
FIG. 18A is an explanatory view illustrating a relationship between a measurement waveform obtained in the measuring processing of Comparative Example 1 and an object.

Next, the measurement waveform obtained in the measuring processing of Comparative Example 1 will be described with reference to FIGS. 18A to 18D. FIG. 18A is an explanatory view illustrating a relationship between the measurement waveform obtained in the measuring processing of Comparative Example 1 and object 71 in a case where there is no abnormality in melting portion 74 similar to (a) of FIG. 7. In the measurement waveform of FIG. 18A, the signal intensity changes at time t21 to t22 similar to the change in the output of laser beam L1 of FIG. 6.

Figure 18B:
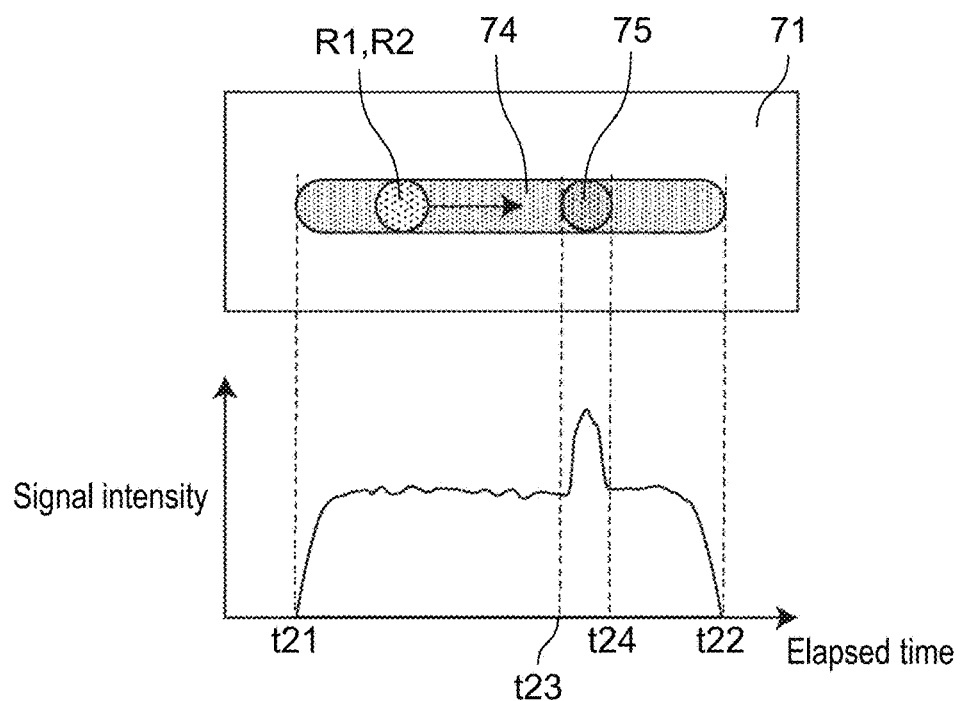
FIG. 18B is another explanatory view illustrating a relationship between the measurement waveform obtained in the measuring processing of Comparative Example 1 and the object.

FIG. 18B is an explanatory view illustrating a relationship between the measurement waveform obtained in the measuring processing of Comparative Example 1 and object 71 in a case where abnormal portion 75 is generated in melting portion 74 similar to (b) of FIG. 7. In the measurement waveform of FIG. 18B, the signal intensity increases at time t23 to t24 when measurement region R2 overlaps abnormal portion 75. In a case where abnormal portion 75 is generated, abnormal portion 75 has an abnormally high temperature as compared with that of normal melting portion 74, so that the signal intensity of light L2 also increases sharply. Therefore, if a large peak is observed in the measurement waveform, it is considered that a melting abnormality is generated at the location of object 71 corresponding to this large peak.

Figure 18C:
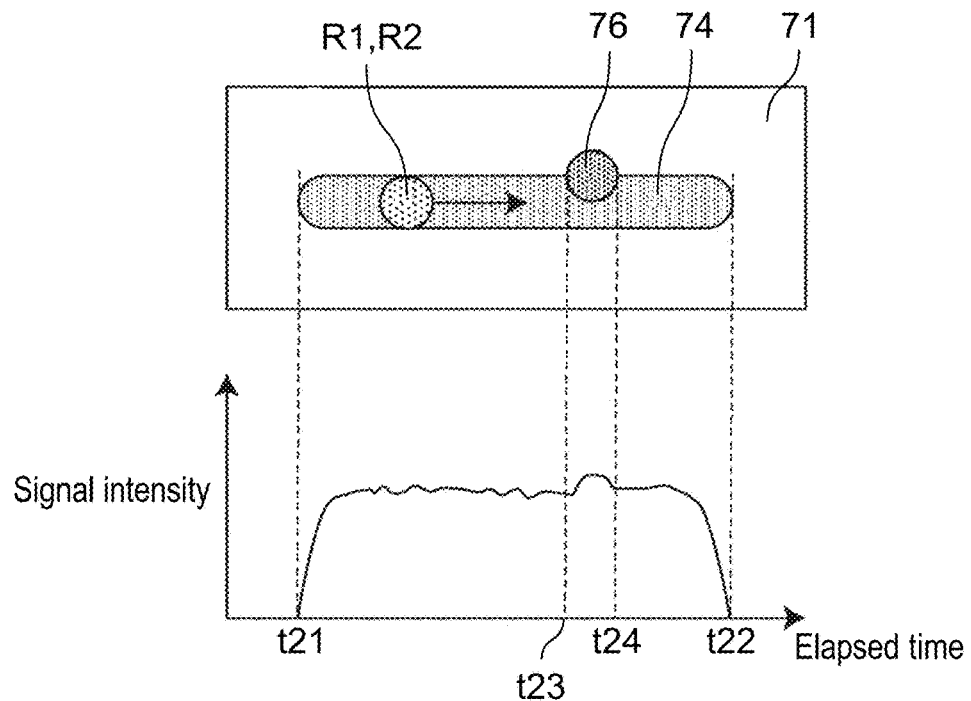
FIG. 18C is another explanatory view illustrating a relationship between the measurement waveform obtained in the measuring processing of Comparative Example 1 and the object.

FIG. 18C is an explanatory view illustrating a relationship between the measurement waveform obtained in the measuring processing of Comparative Example 1 and object 71 in a case where abnormal portion 76 is generated on one side of melting portion 74 similar to (c) of FIG. 7. In the measurement waveform of FIG. 18C, measurement region R2 overlaps a part of abnormal portion 76 at time t23 to t24, but the change in the signal intensity as large as that of FIG. 18B is not observed. Since the change in the signal intensity to the extent illustrated in FIG. 18C is not so different from a fluctuation in general signal intensity, it is difficult to determine whether a melting abnormality is generated.

Figure 18D:
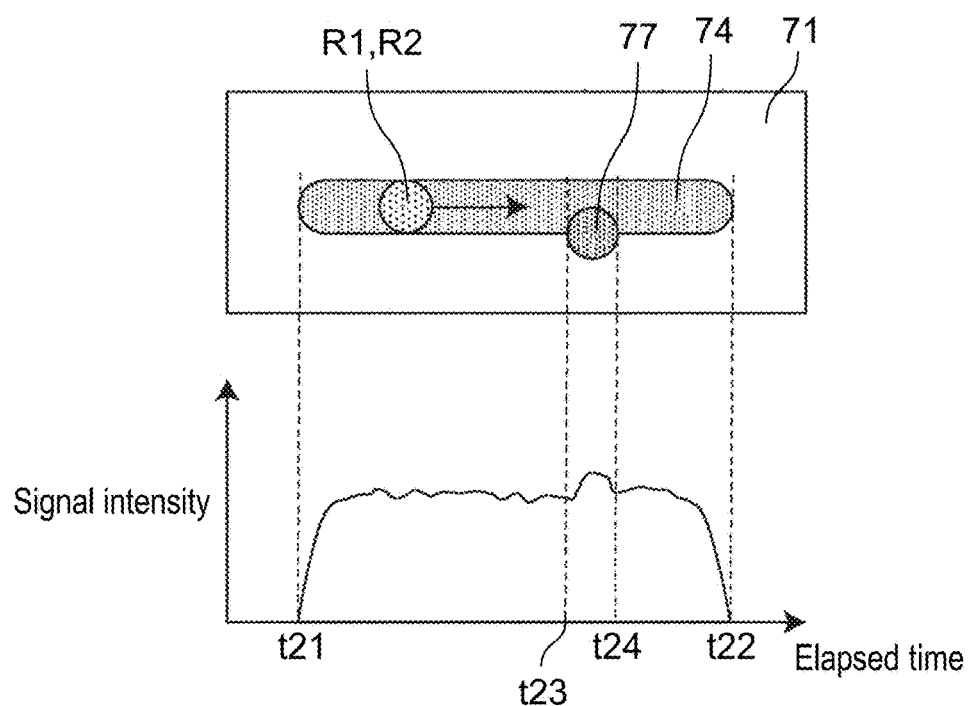
FIG. 18D is another explanatory view illustrating a relationship between the measurement waveform obtained in the measuring processing of Comparative Example 1 and the object.

FIG. 18D is an explanatory view illustrating a relationship between the measurement waveform obtained in the measuring processing of Comparative Example 1 and object 71 in a case where abnormal portion 77 is generated on the other side of melting portion 74 similar to (d) of FIG. 7. In the measurement waveform of FIG. 18D, measurement region R2 overlaps a part of abnormal portion 77 at time t23 to t24, but the change in the signal intensity as large as that of FIG. 18B is not observed. Since the change in the signal intensity to the extent illustrated in FIG. 18D is not so different from a fluctuation in general signal intensity, it is difficult to determine whether a melting abnormality is generated.

The measurement waveform of FIG. 18C corresponds to a case where abnormal portion 76 is generated on one side of melting portion 74 of object 71, and the measurement waveform of FIG. 18D corresponds to a case where abnormal portion 77 is generated on the other side of melting portion 74 of object 71. Although the measurement waveform of FIG. 18C and the measurement waveform of FIG. 18D respectively correspond to the abnormal portions 76 and 77 at different locations, they have substantially the same shape. Therefore, in a case where a measurement waveform similar to the measurement waveforms of FIGS. 18C and 18D is obtained, it is difficult to determine whether the measurement waveform corresponds to the measurement waveform of FIG. 18C or the measurement waveform of FIG. 18D.

As in the measuring processing of Comparative Example 1 described above, when measurement region R2 is moved relative to object 71 so that movement path M21 of measurement region R2 coincides with movement path M1 of irradiation region R1, even if there is abnormal portion 76 on one side or abnormal portion 77 on the other side of melting portion 74, it is difficult to determine that there is an abnormality in the laser machining.

Figure 19A:
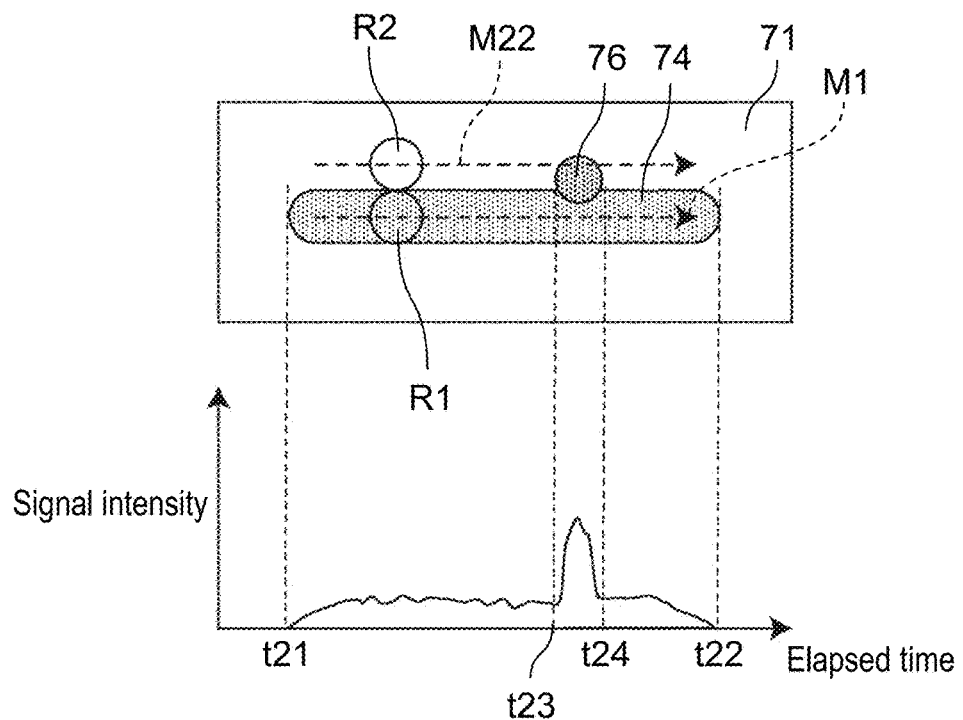
FIG. 19A is an explanatory view illustrating a relationship between a measurement waveform obtained in measuring processing of Comparative Example 2 and an object.

Measuring processing of Comparative Example 2 will be described with reference to FIG. 19A. In order to simplify the description, a case where laser machining system 1 of FIG. 1 executes the measuring processing of Comparative Example 2 will be described below. FIG. 19A is an explanatory view illustrating a relationship between a measurement waveform obtained in the measuring processing of Comparative Example 2 and object 71 in a case where abnormal portion 76 is generated in melting portion 74 similar to (c) of FIG. 7. In the measuring processing of Comparative Example 2, measurement region R2 is moved relative to object 71 so that movement path M22 of measurement region R2 is parallel to movement path M1 of irradiation region R1 but does not pass through melting portion 74. In FIG. 19A, movement path M22 is on one side of the melting portion 74. In the measurement waveform of FIG. 19A, the signal intensity increases at time t23 to t24 when measurement region R2 overlaps abnormal portion 76. In the measuring processing of Comparative Example 2, abnormal portion 76 can be detected, while the change in the signal intensity of the abnormal portions 75 and 77 is not so different from a fluctuation in the general signal intensity. Therefore, it is difficult to detect the abnormal portions 75 and 77 in the measuring processing of Comparative Example 2.

Figure 19B:
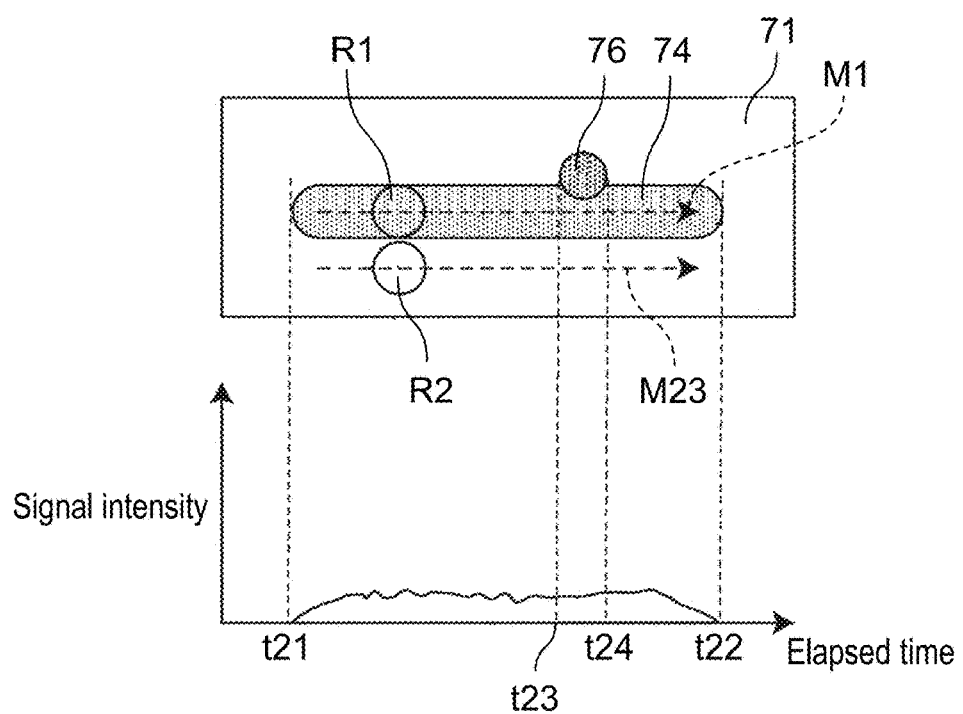
FIG. 19B is an explanatory view illustrating a relationship between a measurement waveform obtained in measuring processing of Comparative Example 3 and an object.

Measuring processing of Comparative Example 3 will be described with reference to FIG. 19B. In order to simplify the description, a case where laser machining system 1 of FIG. 1 executes the measuring processing of Comparative Example 3 will be described below. FIG. 19B is an explanatory view illustrating a relationship between a measurement waveform obtained in the measuring processing of Comparative Example 3 and object 71 in a case where abnormal portion 77 is generated in melting portion 74 similar to (d) of FIG. 7. In the measuring processing of Comparative Example 3, measurement region R2 is moved relative to object 71 so that movement path M22 of measurement region R2 is parallel to movement path M1 of irradiation region R1 but does not pass through melting portion 74. In FIG. 19B, movement path M22 is on the other side of melting portion 74. In the measurement waveform of FIG. 19B, the signal intensity increases at time t23 to t24 when measurement region R2 overlaps abnormal portion 77. In the measuring processing of Comparative Example 3, abnormal portion 77 can be detected, while the change in the signal intensity of abnormal portions 75 and 76 is not so different from a fluctuation of the general signal intensity. Therefore, it is difficult to detect abnormal portions 75 and 76 in the measuring processing of Comparative Example 3.

As described above, it is difficult to stably detect all of abnormal portions 75, 76, and 77 in the measurement waveforms of the measuring processing of Comparative Examples 1 to 3. On the other hand, according to the measurement waveform of measuring processing S2 of the present exemplary embodiment, abnormal portions 75, 76, and 77 can be detected.

1-2-4-3. Evaluating Processing

In evaluating processing S3, an evaluation of the laser machining, that is, an evaluation of the machining in machining processing S1 is performed based on the change in the intensity of light L2 according to the movement of measurement region R2 measured in measuring processing S2. As described above, the measurement waveform obtained in measuring processing S2 includes abnormal melting waveforms such as abnormal melting waveforms A3 to A7 in a case where there is an abnormality in the laser machining. Therefore, it is possible to evaluate whether the laser machining is normal or abnormal depending on the presence or absence of the abnormal melting waveform.

In evaluating processing S3, the evaluation of the laser machining is performed based on the comparison between the measurement waveform and the reference waveform. The measurement waveform is a waveform indicating the change in the intensity of light L2 according to the movement of measurement region R2 measured in measuring processing S2. Examples of the measurement waveform include the measurement waveforms illustrated in FIGS. 3 and 12 to 16. The reference waveform is a waveform indicating the change in the intensity of light L2 according to the movement of measurement region R2 in a case where there is no abnormality in the laser machining. In a case where there is no abnormality in the laser machining, the intensity of light L2 from measurement region R2 is maximized when passing through melting portion 74, is weakened as the distance from melting portion 74 increases, and is minimized at the outermost portion. The reference waveform is a substantially sinusoidal waveform such as the measurement waveform illustrated in FIG. 3.

In evaluating processing S3, it is determined whether there is a change in the intensity of light L2, which is not present in the reference waveform in the measurement waveform based on the comparison between the measurement waveform and the reference waveform. In evaluating processing S3, it is determined that there is no abnormality in the laser machining if there is no change in the intensity of light L2, which is not present in the reference waveform in the measurement waveform. For example, in a case where the measurement waveform illustrated in FIG. 3 is obtained in measuring processing S2, in evaluating processing S3, it is determined that there is no abnormality in the laser machining. In evaluating processing S3, it is determined that there is an abnormality in the laser machining if there is a change in the intensity of light L2, which is not present in the reference waveform in the measurement waveform. For example, in a case where the measurement waveform illustrated in FIG. 12 is obtained in measuring processing S2, in evaluating processing S3, there is abnormal melting waveform A3 indicating the change in the intensity of light L2, which is not present in the reference waveform in the measurement waveform, and thereby it is determined that there is an abnormality in the laser machining. Similarly, in a case where the measurement waveforms illustrated in FIGS. 13 to 16 are obtained in measuring processing S2, in evaluating processing S3, there are abnormal melting waveforms A4, A5, A6, and A7 indicating the change in the intensity of light L2, which is not present in the reference waveform in the measurement waveform, and thereby it is determined that there is an abnormality in the laser machining.

In evaluating processing S3, determination of the location where an abnormality of the laser machining is generated in object 71 is performed based on the position of measurement region R2 when there is a change in the intensity of light L2, which is not present in the reference waveform in the measurement waveform. In the measurement waveform, the elapsed time corresponds to the distance in which measurement region R2 is moved along movement path M2. Therefore, in evaluating processing S3, determination of the position of measurement region R2 on object 71 is performed from the time when the change in the intensity of light L2, which is not present in the reference waveform, is generated. In evaluating processing S3, the determination of the location where the abnormality of the laser machining is generated in object 71 is performed from the position of measurement region R2 on object 71.

In evaluating processing S3, a result of the evaluation of the laser machining is output. In evaluating processing S3, for example, information indicating the evaluation result of the laser machining can be output to an external device such as a terminal device by wireless or wired communication. In evaluating processing S3, for example, information indicating the evaluation result of the laser machining can be output to the image display device.

1-3. Effects, and the Like

As described above, laser machining system 1 of FIG. 1 includes laser oscillator 21 for irradiating object 71 with laser beam L1, photometer 31 that measures the intensity of light L2, and processing device 5 that is connected to laser oscillator 21 and photometer 31. Processing device 5 executes machining processing S1, measuring processing S2, and evaluating processing S3. In machining processing S1, irradiation region R1 of laser beam L1 from laser oscillator 21 to object 71 is moved relative to object 71 to perform machining of object 71. In measuring processing S2, measurement region R2 of photometer 31 is moved relative to object 71 to measure the change in the intensity of light L2 according to the movement of measurement region R2 by photometer 31. In evaluating processing S3, the evaluation of the machining in machining processing S1 is performed based on the change in the intensity of light L2 according to the movement of measurement region R2 measured in measuring processing S2. In measuring processing S2, measurement region R2 is moved relative to object 71 so that movement path M2 of measurement region R2 has a plurality of intersections P3 with movement path M1 of irradiation region R1.

In laser machining system 1 of FIG. 1, measurement region R2 for measuring thermal radiation light L2 reciprocates at high speed in a direction intersecting moving direction D1 of irradiation region R1 of laser beam L1. Therefore, it is possible to evaluate the quality of overall laser machining including not only melting portion 74 that is melted by laser beam L1 in object 71, but also the periphery of melting portion 74 and the unmelting portion (solidified portion) that is not affected by the irradiation of laser beam L1. In laser machining system 1 of FIG. 1, laser machining can be evaluated within a two-dimensional range in moving direction D1 of irradiation region R1 and a direction intersecting moving direction D1. Therefore, it is possible to reduce a possibility that object 71 having an abnormality in the laser machining is supplied to a process after the laser machining.

In laser machining system 1 of FIG. 1, processing device 5 moves irradiation region R1 of laser beam L1 from laser oscillator 21 to object 71, relative to object 71 to execute an evaluation method of the laser machining in which machining of object 71 is performed. The evaluation method includes a measurement step and an evaluation step. In the measurement step, measurement region R2 of photometer 31 for measuring the intensity of light L2 is moved relative to object 71 to measure the change in the intensity of light L2 according to the movement of measurement region R2 by photometer 31. In the evaluation step, the evaluation of the laser machining is performed based on the change in the intensity of light L2 according to the movement of measurement region R2 measured in the measurement step. In the measurement step, measurement region R2 is moved relative to object 71 so that movement path M2 of measurement region R2 has the plurality of intersections P3 with movement path M1 of irradiation region R1 and measurement region R2 overlaps at least a part of irradiation region R1 at at least one of the plurality of intersections P3. According to this evaluation method, it is possible to improve the accuracy of evaluation of laser machining.

From another point of view, processing device 5 configures an evaluation system of the laser machining in which irradiation region R1 of laser beam L1 from laser oscillator 21 to object 71 is moved relative to object 71 to perform the machining of object 71. The evaluation system includes processing device 5 that executes measuring processing S2 and evaluating processing S3. In measuring processing S2, measurement region R2 of photometer 31 for measuring the intensity of light L2 is moved relative to object 71 to measure the change in the intensity of light L2 according to the movement of measurement region R2 by photometer 31. In evaluating processing S3, the laser machining is evaluated based on the change in the intensity of light L2 according to the movement of measurement region R2 measured in measuring processing S2. In measuring processing S2, measurement region R2 is moved relative to object 71 so that movement path M2 of measurement region R2 has the plurality of intersections P3 with movement path M1 of irradiation region R1 and measurement region R2 overlaps at least a part of irradiation region R1 at at least one of the plurality of intersections P3. According to this evaluation system, it is possible to improve the accuracy of the evaluation of the laser machining.

The evaluation system further includes measurement system 3. Measurement system 3 includes photometer 31, optical member 33 that guides light L2 from measurement region R2 to photometer 31 and can change a position thereof with respect to photometer 31 to move measurement region R2 relative to object 71, and adjustment device 36 that changes the position of optical member 33 with respect to photometer 31. In measuring processing S2, the position of optical member 33 with respect to photometer 31 is changed by adjustment device 36 to move measurement region R2 relative to object 71. According to this evaluation system, it is possible to improve the accuracy of the evaluation of the laser machining.

In laser machining system 1 of FIG. 1, in measuring processing S2, measurement region R2 is moved relative to the object 71 so that measurement region R2 overlaps at least a part of irradiation region R1 at at least one of the plurality of intersections P3. Therefore, it is possible to measure the change in the intensity of light L2 in irradiation region R1.

In laser machining system 1 of FIG. 1, in measuring processing S2, measurement region R2 is moved relative to object 71 so that movement path M2 of measurement region R2 meanders. Therefore, it is possible to measure the change in the intensity of light L2 according to the movement of measurement region R2 with only one measurement region R2.

In laser machining system 1 of FIG. 1, in measuring processing S2, measurement region R2 is moved relative to object 71 so that measurement region R2 overlaps at least a part of irradiation region R1 in moving direction D1 of irradiation region R1. In measuring processing S2, measurement region R2 reciprocates relative to object 71 based on movement path M1 of irradiation region R1 in the defined direction intersecting moving direction D1. Therefore, it possible to measure the change in the intensity of light L2 according to the movement of measurement region R2 with a simple configuration.

In laser machining system 1 of FIG. 1, in measuring processing S2, measurement system 3 is used to measure the change in the intensity of light L2 with respect to the movement of measurement region R2. Measurement system 3 includes photometer 31, optical member 33 that guides light L2 from measurement region R2 to photometer 31 and can adjust a position thereof with respect to photometer 31 to move measurement region R2 relative to object 71, and adjustment device 36 that adjusts the position of optical member 33 with respect to photometer 31. In measuring processing S2, the position of optical member 33 with respect to photometer 31 is adjusted by adjustment device 36 to move measurement region R2 relative to object 71. Therefore, it possible to measure the change in the intensity of light L2 according to the movement of measurement region R2 with a simple configuration.

In laser machining system 1 of FIG. 1, in measuring processing S2, measurement region R2 reciprocates in the defined direction with a predetermined width. When the predetermined width is defined as W [mm] and the width of planned melting region 73 of object 71 by irradiating object 71 with laser beam L1 is defined as d [mm], W satisfies W≥2×d. Therefore, it possible to evaluate the state around melting portion 74 of object 71 in the defined direction intersecting moving direction D1 of irradiation region R1.

In laser machining system 1 of FIG. 1, when the moving speed of irradiation region R1 is defined as V [mm/s], the dimension of measurement region R2 in moving direction D1 of irradiation region R1 is defined as D [mm], and a reciprocation frequency in the defined direction of measurement region R2 is defined as F [Hz], F satisfies F≥V/D. Therefore, it is possible to evaluate the overall state of melting portion 74 of object 71 in moving direction D1 of irradiation region R1.

In laser machining system 1 of FIG. 1, in evaluating processing S3, the evaluation of the laser machining is performed based on the comparison between the measurement waveform and the reference waveform. The measurement waveform is a waveform indicating the change in the intensity of light L2 according to the movement of measurement region R2 measured in measuring processing S2. The reference waveform is a waveform indicating the change in the intensity of light L2 according to the movement of measurement region R2 in a case where there is no abnormality in the laser machining. Therefore, it is possible to improve the accuracy of the evaluation of the laser machining.

In laser machining system 1 of FIG. 1, in evaluating processing S3, a change in the intensity of light L2 that is not present in the reference waveform is confirmed in the measurement waveform and it is determined that there is an abnormality in the laser machining. Therefore, it is possible to improve the accuracy of the evaluation of the laser machining.

In laser machining system 1 of FIG. 1, in evaluating processing S3, determination of where the abnormality of the laser machining is generated in object 71 is performed based on the position of measurement region R2 when there is a change in the intensity of light L2, which is not present in the reference waveform in the measurement waveform. Therefore, it is possible to know where an abnormality is generated in the evaluation of the laser machining.

MODIFIED EXAMPLES

Exemplary embodiments of the present disclosure are not limited to the above-described exemplary embodiments. The above-described exemplary embodiments can be changed in various ways depending on the design and the like as long as the object of the present disclosure can be achieved. The following is a list of modified examples of the above-described exemplary embodiment. The modified examples described below can be applied in combination as appropriate.

In the above-described exemplary embodiments, in measuring processing S2, optical member 33 reciprocates between the first position illustrated in FIG. 9 and the second position illustrated in FIG. 10 by adjustment device 36. The basic position is an intermediate position between the first position and the second position. In one modified example, the basic position is not an intermediate position between the first and second positions, and the first and second positions can be adjusted so that the basic position is closer to one of the first and second positions than the other.

Figure 20:
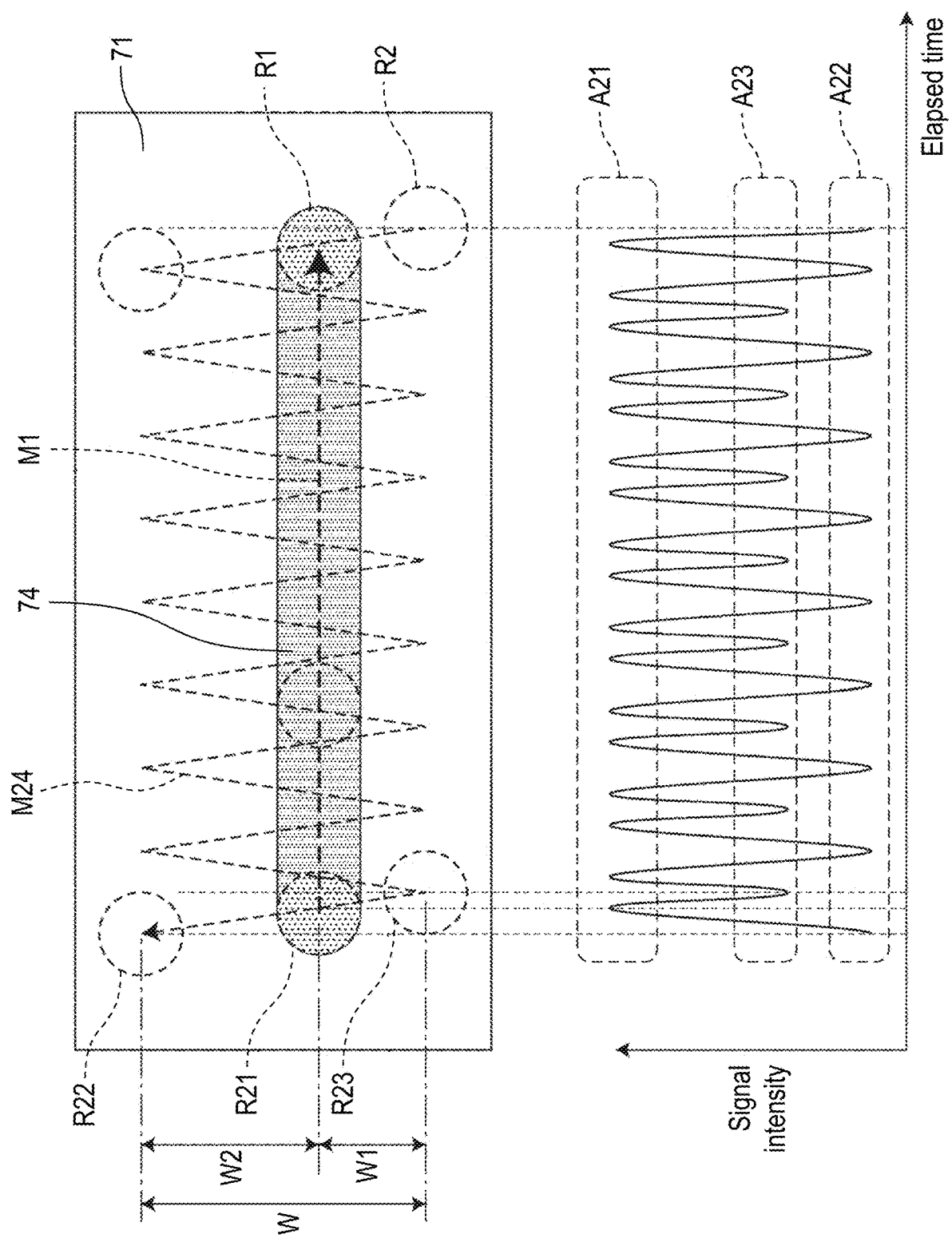
FIG. 20 is an explanatory view illustrating a relationship between a measurement waveform obtained in measuring processing of a modified example and an object.

FIG. 20 is an explanatory view illustrating a relationship between a measurement waveform obtained in the measuring processing of the modified example and the object. In the measuring processing of the modified example, movement path M24 is set such that movement path M1 does not pass through a center of movement path M24 in the defined direction. Distance W2 between measurement region R21 and measurement region R23 in the defined direction is smaller than distance W1 between measurement region R21 and measurement region R22 in the defined direction. In the modified example of FIG. 20, the first position and the second position are adjusted so that the basic position is closer to the second position than the first position.

The measurement waveform of FIG. 20 includes waveform A21 corresponding to peaks and waveforms A22 and A23 corresponding to valleys between peaks. Waveform A21 corresponds to a change in the intensity of light L2 in measurement region R21. Waveforms A22 and A23 are both waveforms of valleys between peaks, but the intensity of the valley of waveform A22 is lower than the intensity of valley of waveform A23. In movement path M24, measurement region R22 is farther from melting portion 74 than measurement region R23. Therefore, the intensity of light L2 in measurement region R22 is smaller than the intensity of light L2 in measurement region R23. Therefore, waveform A22 corresponds to the change in the intensity of light L2 in measurement region R22, and waveform A23 corresponds to the change in the intensity of light L2 in measurement region R23. As described above, in the measurement waveform of FIG. 20, it is possible to determine which of measurement region R22 and measurement region R23 is the intensity of light L2 by the signal intensity.

In one modified example, in measuring processing S2, measurement region R2 necessarily may not be moved relative to object 71 so that measurement region R2 overlaps at least a part of irradiation region R1 at at least one of the plurality of intersections P3. That is, at intersection P3, measurement region R2 may not coincide with irradiation region R1. For example, at intersection P3, measurement region R2 may coincide with the previous irradiation region R1. In other words, measurement region R2 may be reciprocally scanned at high speed in the defined direction intersecting moving direction D1 with the position behind irradiation region R1 in moving direction D1 as a center. In this way, it is possible to evaluate the quality of the laser machining of melting portion 74, the periphery of melting portion 74, and the solidified portion, not when the melting is performed by laser beam L1 but when a time has elapsed since the melting is performed by laser beam L1.

In one modified example, laser machining system 1 may be used for welding objects 71 and 72 disposed side by side instead of welding objects 71 and 72 stacked one above the other. The laser machining in laser machining system 1 is not limited to laser welding, and may be laser cutting.

In one modified example, the configurations of laser irradiation system 2, measurement system 3, and movement system 4 are not limited to the configurations of the above-described exemplary embodiments. The configurations of laser irradiation system 2, measurement system 3, and movement system 4 can be changed as appropriate.

In laser irradiation system 2, the number of laser oscillators 21 is not particularly limited. The configuration and disposition of the optical system including collimating lens 22, dichroic mirror 23, and condenser lens 24 are not particularly limited.

In measurement system 3, the number of photometers 31 is not particularly limited. A plurality of measurement regions R2 may move along movement path M2. The plurality of measurement regions R2 may move along different movement paths M2. The configuration and disposition of the optical system including bandpass filter 34 and imaging lens 35 are not particularly limited. The configurations of optical member 33 and adjustment device 36 are not particularly limited. Measurement system 3 may have a configuration in which measurement region R2 reciprocates within a predetermined width in moving direction D1 of irradiation region R1. In this case, in the measuring processing, in moving direction D1 of irradiation region R1, measurement region R2 can reciprocate relative to object 71 based on irradiation region R1. Such a configuration can be realized by setting the direction of the rotation axis of optical member 33 to be orthogonal to moving direction D1. Therefore, measurement region R2 can reciprocate at high speed in the same direction as moving direction D1 of irradiation region R1. The quality of the laser machining melting portion 74, around melting portion 74, and the solidified portion can be evaluated, not when melting is performed by laser beam L1 but when before and after melting is performed by laser beam L1.

Movement system 4 is not limited to a configuration in which stage 41 on which object 71 is placed is linearly moved. Movement system 4 may move stage 41 along a desired movement path.

The movement path of stage 41 may be appropriately determined according to the content of the laser machining. Movement system 4 may move laser irradiation system 2 and measurement system 3 instead of stage 41.

ASPECTS

As will be apparent from the above-described exemplary embodiments and modified examples, the present disclosure includes the following aspects. In the following, reference numerals are given in parentheses only to clearly indicate the correspondence with the exemplary embodiments.

A first aspect is an evaluation method of laser machining in which irradiation region (R1) of laser beam (L1) from laser oscillator (21) to object (71) is moved relative to object (71) to perform machining of object (71). The evaluation method includes a measurement step and an evaluation step. In the measurement step, measurement region (R2) of photometer (31) for measuring the intensity of light (L2) is moved relative to object (71) to measure the change in the intensity of light (L2) according to the movement of measurement region (R2) by photometer (31). In the evaluation step, the evaluation of the laser machining is performed based on the change in the intensity of light (L2) according to the movement of measurement region (R2) measured in the measurement step. In the measurement step, measurement region (R2) is moved relative to object (71) so that the movement path (M2) of measurement region (R2) has a plurality of intersections (P3) with movement path (M1) of irradiation region (R1). According to this aspect, it is possible to improve the accuracy of the evaluation of the laser machining.

A second aspect is the evaluation method based on the first aspect. In the second aspect, in the measurement step, measurement region (R2) is moved relative to object (71) so that measurement region (R2) overlaps at least a part of irradiation region (R1) at at least one of the plurality of intersections (P3). According to this aspect, it is possible to measure the change in the intensity of light L2 in irradiation region (R1).

A third aspect is the evaluation method based on the first or second aspect. In the third aspect, in the measurement step, measurement region (R2) is moved relative to object (71) so that the movement path (M2) of measurement region (R2) meanders. According to this aspect, it is possible to measure the change in the intensity of light (L2) according to the movement of measurement region (R2) with only one measurement region (R2).

A fourth aspect is the evaluation method based on any one of the first to third aspects. In the fourth aspect, in the measurement step, measurement region (R2) is moved relative to object (71) so that measurement region (R2) overlaps at least a part of irradiation region (R1) in moving direction (D1) of irradiation region (R1). In the measurement step, measurement region (R2) reciprocates relative to object (71) in the defined direction intersecting moving direction (D1) based on movement path (M1) of irradiation region (R1). According to this aspect, it is possible to measure the change in the intensity of light (L2) according to the movement of measurement region (R2) with a simple configuration.

A fifth aspect is the evaluation method based on the fourth aspect. In the fifth aspect, in the measurement step, the measurement system (3) is used to measure the change in the intensity of light (L2) with respect to the movement of measurement region (R2). Measurement system (3) includes photometer (31), optical member (33) that guides light (L2) from measurement region (R2) to photometer (31) and of which a position is adjustable with respect to photometer (31) to move measurement region (R2) relative to object (71), and adjustment device (36) that adjusts the position of optical member (33) with respect to photometer (31). In the measurement step, measurement region (R2) is moved relative to object (71) by adjusting the position of optical member (33) with respect to photometer (31) by adjustment device (36). According to this aspect, it is possible to measure the change in the intensity of light (L2) according to the movement of measurement region (R2) with a simple configuration.

A sixth aspect is the evaluation method based on the fourth or fifth aspect. In the sixth aspect, in the measurement step, measurement region (R2) reciprocates in the defined direction with a predetermined width. When the predetermined width is defined as W [mm] and the width of planned melting region (73) of object (71) by irradiating object (71) with laser beam L1 is defined as d [mm], W satisfies W≥2×d. According to this aspect, it possible to evaluate the state around melting portion (74) of object (71) in the defined direction intersecting moving direction (D1) of irradiation region (R1).

A seventh aspect is the evaluation method based on any one of the fourth to sixth aspects. In the seventh aspect, when the moving speed of irradiation region (R1) is defined as V [mm/s], the dimension of measurement region (R2) in moving direction (D1) of irradiation region (R1) is defined as D [mm], and a reciprocation frequency in the defined direction of measurement region (R2) is defined as F [Hz], F satisfies F≥V/D. According to this aspect, it is possible to evaluate the overall state of melting portion (74) of object (71) in moving direction (D1) of irradiation region (R1).

An eighth aspect is the evaluation method based on any one of the first to seventh aspects. In the eighth aspect, in evaluation step, the evaluation of the laser machining is performed based on the comparison between the measurement waveform and the reference waveform. The measurement waveform is a waveform indicating the change in the intensity of light (L2) according to the movement of measurement region (R2) measured in the measurement step. The reference waveform is a waveform indicating the change in the intensity of light (L2) according to the movement of measurement region (R2) in a case where there is no abnormality in the laser machining. According to this aspect, it is possible to improve the accuracy of the evaluation of the laser machining.

A ninth aspect is the evaluation method based on the eighth aspect. In the ninth aspect, in the evaluation step, the change in the intensity of light (L2) that is not present in the reference waveform is confirmed in the measurement waveform, and determination is made that an abnormality is present in the laser machining. According to this aspect, it is possible to improve the accuracy of the evaluation of the laser machining.

A tenth aspect is the evaluation method based on the eighth or ninth aspect. In the tenth aspect, in evaluation step, a determination of a location in object (71), at which an abnormality of the laser machining is generated, is performed based on a position of measurement region (R2) when there is a change in intensity of light (L2), which is not present in the reference waveform in the measurement waveform. According to this aspect, it is possible to know where an abnormality is generated in the evaluation of the laser machining.

An eleventh aspect is an evaluation system of the laser machining, which moves irradiation region (R1) of laser beam (L1) from laser oscillator (21) to object (71), relative to object (71) to perform machining of object (71). The evaluation system includes processing device (5) that executes measuring processing (S2) and evaluating processing (S3). In measuring processing (S2), measurement region (R2) of photometer (31) for measuring the intensity of light (L2) is moved relative to object (71) to measure the change in the intensity of light (L2) according to the movement of measurement region (R2) by photometer (31). In evaluating processing (S3), the evaluation of the laser machining is performed based on the change in the intensity of light (L2) according to the movement of measurement region (R2) measured in measuring processing (S2). In measuring processing (S2), measurement region (R2) is moved relative to object (71) so that movement path (M2) of measurement region (R2) has a plurality of intersections (P3) with movement path (M1) of irradiation region (R1). According to this aspect, it is possible to improve the accuracy of the evaluation of the laser machining.

A twelfth aspect is the evaluation system based on the eleventh aspect. In the twelfth aspect, the evaluation system further includes measurement system (3). Measurement system (3) includes photometer (31), optical member (33) that guides light (L2) from measurement region (R2) to photometer (31) and changes a position thereof with respect to photometer (31) to move measurement region (R2) relative to object (71), and adjustment device (36) that changes the position of optical member (33) with respect to photometer (31). In measuring processing (S2), measurement region (R2) is moved relative to object (71) by changing the position of optical member (33) with respect to photometer (31) by adjustment device (36). According to this aspect, it is possible to improve the accuracy of the evaluation of the laser machining.

A thirteenth aspect is laser machining system (1). Laser machining system (1) includes laser oscillator (21) for irradiating object (71) with laser beam (L1), photometer (31) that measures an intensity of light (L2), and processing device (5) that is connected to laser oscillator (21) and photometer (31). Processing device (5) executes machining processing (S1), measuring processing (S2), and evaluating processing (S3). In machining processing (S1), irradiation region (R1) of laser beam (L1) from laser oscillator (21) to object (71) is moved relative to object (71) to perform machining of object (71). In measuring processing (S2), measurement region (R2) of photometer (31) is moved relative to object (71) to measure a change in the intensity of light (L2) according to a movement of measurement region (R2) by photometer (31). In evaluating processing (S3), evaluation of the machining in machining processing (S1) is performed based on the change in the intensity of light (L2) according to the movement of measurement region (R2) measured in measuring processing (S2). In measuring processing (S2), measurement region (R2) is moved relative to object (71) so that movement path (M2) of measurement region (R2) has a plurality of intersections (P3) with movement path (M1) of irradiation region (R1). According to this aspect, it is possible to improve the accuracy of the evaluation of the laser machining.

As described above, the exemplary embodiments have been described as examples of the technique in the present disclosure. To that end, the attached drawings and detailed description are provided. Therefore, among the configuration elements described in the attached drawings and the detailed description, not only the configuration elements essential for solving the problem but also configuration elements which are not essential for solving the problem can also be included in order to exemplify the above technology. Therefore, the fact that those non-essential configuration elements are described in the attached drawings and detailed description should not immediately determine that those non-essential components are essential. Since the above-described exemplary embodiments are for exemplifying the technique in the present disclosure, various changes, replacements, additions, omissions, or the like can be made within the scope of claims or the equivalent scope thereof.

The present disclosure is applicable to an evaluation method, an evaluation system, and a laser machining system. Specifically, the present disclosure can be applied to an evaluation method, an evaluation system, and a laser machining system in which an evaluation of laser machining is performed by using light generated by an object due to irradiation of a laser beam to the object.

What is claimed is:

1. An evaluation method of laser machining in which an irradiation region of a laser beam from a laser oscillator to an object is moved relative to the object to perform machining of the object, the evaluation method comprising:
   a measurement step of measuring a change in an intensity of light generated by the laser beam that is laser machining the object according to a movement of a measurement region by a photometer for measuring the intensity of light by moving the measurement region of the photometer relative to the object; and
   an evaluation step of performing an evaluation of the laser machining based on the change in the intensity of light according to the movement of the measurement region measured in the measurement step,
   wherein in the measurement step, the measurement region is moved relative to the object from a first measurement region to a last measurement region so that a movement path of the measurement region has both a time intersecting a movement path of the irradiation region and a time not intersecting the movement path of the irradiation region, the intensity of light being continuously measured from the first measurement region to the last measurement region, and
   wherein in the measurement step, the measurement region is moved relative to the object so that the movement path of the measurement region meanders.

2. The evaluation method of claim 1,
   wherein in the measurement step, the measurement region is moved relative to the object so that the measurement region overlaps at least a part of the irradiation region at at least one of a plurality of intersections between the movement path of the measurement region and the movement path of the irradiation region.

3. The evaluation method of claim 1, wherein
   in the measurement step, the measurement region is moved relative to the object so that the measurement region overlaps at least a part of the irradiation region in a moving direction of the irradiation region, and
   the measurement region reciprocates relative to the object based on the movement path of the irradiation region in a defined direction intersecting the moving direction.

4. The evaluation method of claim 3, wherein
   in the measurement step, the change in the intensity of light with respect to the movement of the measurement region is measured by a measurement system,
   the measurement system includes
   the photometer,
   an optical member that guides light from the measurement region to the photometer and of which a position is adjustable with respect to the photometer so that the measurement region moves relative to the object, and
   an adjustment device that adjusts the position of the optical member with respect to the photometer, and
   in the measurement step, the measurement region is moved relative to the object by adjusting the position of the optical member with respect to the photometer by the adjustment device.

5. The evaluation method of claim 3, wherein
   in the measurement step, the measurement region reciprocates with a predetermined width in the defined direction, and
   when the predetermined width is defined as W [mm], and a width of a planned melting region of the object by irradiation of the laser beam to the object is defined as d [mm], W satisfies the following equation, $$W \geq 2 \times d.$$

6. The evaluation method of claim 3,
   wherein when a moving speed of the irradiation region is defined as V [mm/s], a dimension of the measurement region in the moving direction of the irradiation region is defined as D [mm], and a reciprocation frequency of the measurement region in the defined direction is defined as F [Hz], F satisfies the following equation, $$F \geq V/D.$$

7. The evaluation method of claim 1, wherein
   in the evaluation step, the evaluation of the laser machining is performed based on a comparison between a measurement waveform and a reference waveform,
   the measurement waveform is a waveform indicating a change in the intensity of light according to the movement of the measurement region measured in the measurement step, and
   the reference waveform is a waveform indicating a change in the intensity of light according to the movement of the measurement region when there is no abnormality in the laser machining.

8. The evaluation method of claim 7, wherein
   in the evaluation step, a change in the intensity of light that is not present in the reference waveform is confirmed in the measurement waveform, and
   determination is made that an abnormality is present in the laser machining.

9. The evaluation method of claim 7,
   wherein in the evaluation step, a determination of a location in the object, at which an abnormality of the laser machining is generated, is performed based on a position of the measurement region when there is the change in the intensity of light that is not present in the reference waveform in the measurement waveform.

10. An evaluation system of laser machining in which an irradiation region of a laser beam from a laser oscillator to an object is moved relative to the object to perform machining of the object, the evaluation system comprising:
    a memory; and
    a processing device that executes measuring processing and evaluating processing, wherein
    in the measuring processing, a measurement region of a photometer for measuring an intensity of light generated by the laser beam that is laser machining the object is moved relative to the object to measure a change in the intensity of light according to a movement of the measurement region by the photometer, in the evaluating processing, an evaluation of the laser machining is performed based on the change in the intensity of light according to the movement of the measurement region measured in the measuring processing, in the measuring processing, the measurement region is moved relative to the object from a first measurement region to a last measurement region so that a movement path of the measurement region has both a time intersecting a movement path of the irradiation region and a time not intersecting the movement path of the irradiation region, the intensity of light being continuously measured from the first measurement region to the last measurement region, and in the measuring processing, the measurement region is moved relative to the object so that the movement path of the measurement region meanders.

11. The evaluation system of claim 10, further comprising:

a measurement system, wherein the measurement system includes the photometer, an optical member that guides light from the measurement region to the photometer, and of which a position with respect to the photometer is changed to move the measurement region relative to the object, and an adjustment device that changes the position of the optical member with respect to the photometer, and in the measuring processing, the measurement region is moved relative to the object by changing the position of the optical member with respect to the photometer by the adjustment device.

12. A laser machining system comprising:

a laser oscillator for irradiating an object with a laser beam;

a photometer that measures an intensity of light; and a processing device that is connected to the laser oscillator and the photometer, wherein the processing device executes machining processing, measuring processing, and evaluating processing, in the machining processing, an irradiation region of the laser beam from the laser oscillator to the object is moved relative to the object to perform laser machining of the object, in the measuring processing, a measurement region of the photometer is moved relative to the object to measure a change in the intensity of light generated by the laser beam that is laser machining the object according to a movement of the measurement region by the photometer, in the evaluating processing, an evaluation of the laser machining in the machining processing is performed based on the change in the intensity of light according to the movement of the measurement region measured in the measuring processing, in the measuring processing, the measurement region is moved relative to the object from a first measurement region to a last measurement region so that a movement path of the measurement region has both a time intersecting a movement path of the irradiation region and a time not intersecting the movement path of the irradiation region, the intensity of light being continuously measured from the first measurement region to the last measurement region, and in the measuring processing, the measurement region is moved relative to the object so that the movement path of the measurement region meanders.

* * * * *